(12) United States Patent
Nemazie et al.

(10) Patent No.: US 7,986,630 B1
(45) Date of Patent: Jul. 26, 2011

(54) HIGH PERFORMANCE ARCHITECTURE FOR FIBER CHANNEL TARGETS AND TARGET BRIDGES

(75) Inventors: Siamack Nemazie, Los Altos Hills, CA (US); Shiang-Jyh Chang, San Jose, CA (US); Young-Ta Wu, Fremont, CA (US); Andrew Hyonil Chong, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 960 days.

(21) Appl. No.: 11/165,713

(22) Filed: Jun. 24, 2005

Related U.S. Application Data

(63) Continuation-in-part of application No. 10/986,732, filed on Nov. 12, 2004, now Pat. No. 7,526,587, which is a continuation-in-part of application No. 10/775,523, filed on Feb. 9, 2004, now Pat. No. 7,539,797, which is a continuation-in-part of application No. 10/775,521, filed on Feb. 9, 2004, now Pat. No. 7,523,236, which is a continuation-in-part of application No. 10/775,488, filed on Feb. 9, 2004, now Pat. No. 7,523,235.

(51) Int. Cl.
*G01R 31/08* (2006.01)

(52) U.S. Cl. ........................ 370/236; 370/470; 370/230.1

(58) Field of Classification Search .................. 370/470, 370/230, 230.1, 235, 235.1, 236
See application file for complete search history.

(56) References Cited

U.S. PATENT DOCUMENTS

| | | | |
|---|---|---|---|
| 5,440,752 A | | 8/1995 | Lentz et al. |
| 5,610,745 A | * | 3/1997 | Bennett ............................ 398/52 |
| 5,946,322 A | * | 8/1999 | Moura et al. ................... 370/468 |
| 6,038,235 A | * | 3/2000 | Ho et al. ......................... 370/462 |
| 6,247,100 B1 | | 6/2001 | Drehmel et al. |
| 6,279,057 B1 | * | 8/2001 | Westby ........................... 710/52 |
| 6,388,590 B1 | | 5/2002 | Ng |
| 6,434,620 B1 | | 8/2002 | Boucher et al. |
| 6,735,650 B1 | | 5/2004 | Rothberg |
| 6,763,402 B2 | | 7/2004 | Talati |

(Continued)

FOREIGN PATENT DOCUMENTS

TW          507896          10/2002

OTHER PUBLICATIONS

Klaus-Peter Deyring, Serial ATA: High Speed Serialized AT Attachment, Serial ATA Workgroup, Jan. 7, 2003, p. 1-35, Santa Cruz, USA, XP002393220.

(Continued)

*Primary Examiner* — Derrick W Ferris
*Assistant Examiner* — Peter Cheng
(74) *Attorney, Agent, or Firm* — Maryam Imam; IPxLaw Group LLP

(57) ABSTRACT

An embodiment of the present invention is disclosed to include a fiber channel target device for receiving information in the form of frames and including a controller device coupled to a microprocessor for processing the frames received from the host, at least one receive buffer for storing the frames and having a buffer size, the controller device issuing credit to the host for receipt of further frames in a manner wherein only one microprocessor is needed to process the frames while maintaining a buffer size that is as small as the number of first type of frames that can be received by the fiber channel target device from the host.

5 Claims, 22 Drawing Sheets

U.S. PATENT DOCUMENTS

| | | | |
|---|---|---|---|
| 7,154,905 | B2 | 12/2006 | Shin et al. |
| 2003/0033465 | A1 | 2/2003 | Chien et al. |
| 2003/0131166 | A1 | 7/2003 | Utsunomiya et al. |
| 2003/0236953 | A1 | 12/2003 | Grieff et al. |
| 2004/0027987 | A1* | 2/2004 | Bergamasco et al. ......... 370/229 |
| 2005/0050240 | A1* | 3/2005 | Wilkins et al. .................. 710/15 |
| 2005/0120150 | A1 | 6/2005 | Lissel et al. |
| 2005/0198425 | A1 | 9/2005 | Wang |
| 2006/0031612 | A1 | 2/2006 | Bashford et al. |
| 2006/0095608 | A1* | 5/2006 | Seto ............................... 710/52 |
| 2006/0136666 | A1 | 6/2006 | Pang et al. |
| 2006/0174049 | A1 | 8/2006 | Lin et al. |
| 2006/0271739 | A1 | 11/2006 | Tsai et al. |

OTHER PUBLICATIONS

Robert C. Elliot, Working Draft American National Standard: Information Technology Serial Attached SCSI-1.1 (SAS-1.1), Project T10/1601-D; Rev. 9e Jul. 24, 2005, Houston, Texas, USA; Reference No. ISO/IEC 14776-151:200x.

Robert C. Elliot, Working Draft American National Standard: Information Technology Serial Attached SCSI-2 (SAS-2), Project T10/1760-D; Rev. 6 Sep. 22, 2006, Houston, Texas, USA; Reference No. ISO/IEC 14776-152:200x.

SATA IO Board Members: Dell Computer Corporation, Hewlett Packard Corporation, Hitachi Packard Corporatioin, Hitachi Global Storage Technologies, Inc., Intel Corporation, Maxtor Corporation, Seagate Technology, Vitesse Semiconductor Corporation, Serial ATA International Organization: Serial ATA Revision 2.5, Oct. 27, 2005.

SATA IO Board Members: Dell Computer Corporation, Hewlett Packard Corporation, Hitachi Packard Corporatioin, Hitachi Global Storage Technologies, Inc., Intel Corporation, Maxtor Corporation, Seagate Technology, Vitesse Semiconductor Corporation, Serial ATA International Organization: Serial ATA Revision 2.6, Feb. 15, 2007.

* cited by examiner

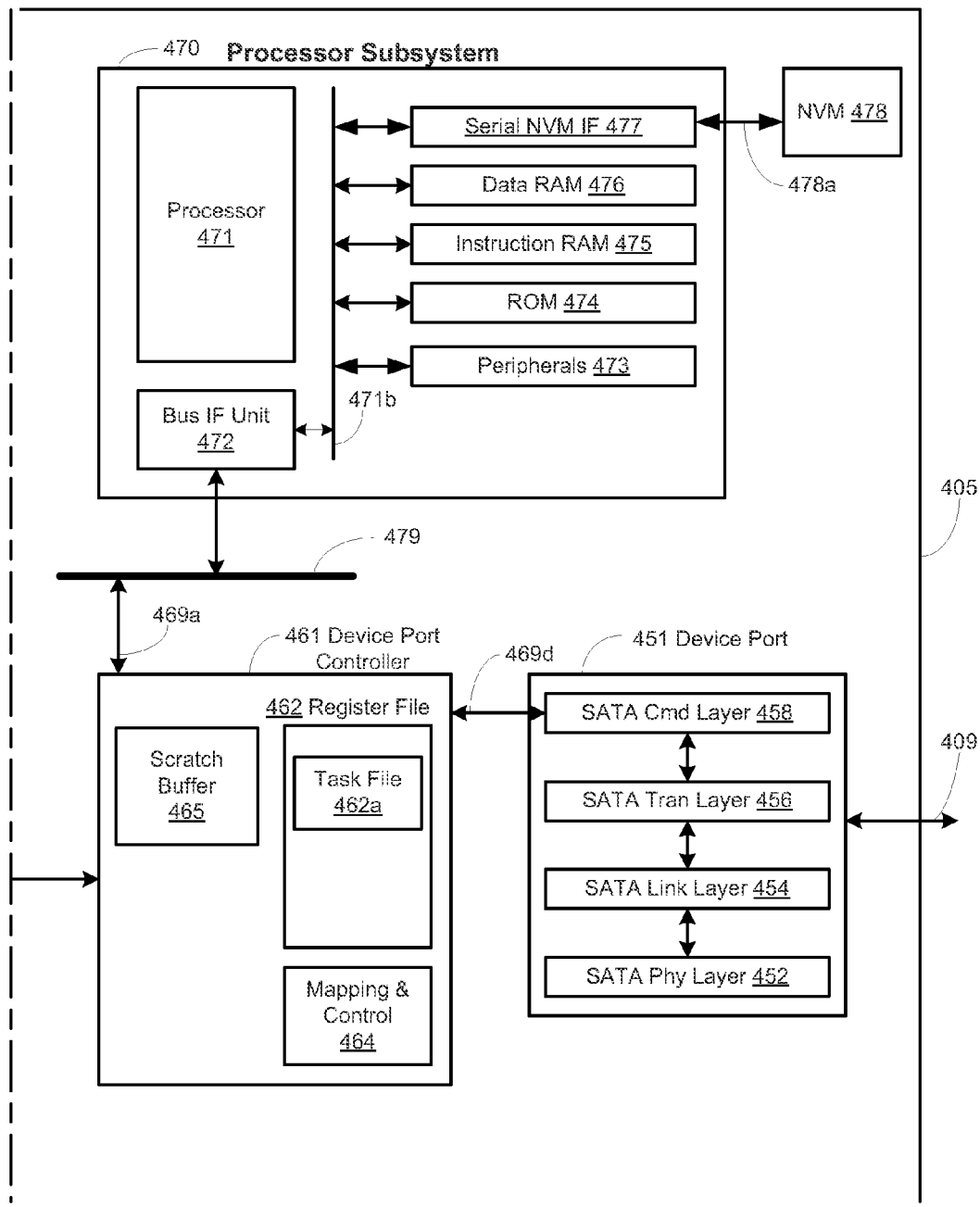
Fig. 3(iii)

| Word | Bits | | | |
|---|---|---|---|---|
| | 31:24 | 23:16 | 15:8 | 7:0 |
| 1 | 511 Control Word (See Fig. 6b for details) | | | |
| 2 | 510a Header | | | |
| 3 | | | | |
| 4 | | | | |
| 5 | | | | |
| 6 | | | | |
| 7 | | | | |
| 8 - N | 518 Payload (if additional payload is saved here instead of the Data Buffer) | | | |

| Word | Bits | | | |
|---|---|---|---|---|
| | 31:24 | 23:16 | 15:8 | 7:0 |
| 1 | 511d (See Fig. 5c for details) | 511c Payload Size | 511b Reserved | 511a BPP |

| Bit | | | | | | | |
|---|---|---|---|---|---|---|---|
| 31 | 30 | 29 | 28 | 27 | 26 | 25 | 24 |
| 511[31] DV | 511[30] DP | 511[29] FCMD | 511[28:26] SOF Type[2:0] | | | 511[25:24] EOF Type[1:0] | |

| Word | Bits | | | |
|---|---|---|---|---|
| | 31:24 | 23:16 | 15:8 | 7:0 |
| 1 | Header or Expected Header of FCP frames<br><br>531 | | | |
| 2 | | | | |
| 3 | | | | |
| 4 | | | | |
| 5 | | | | |
| 6 | 532 Transfer Count | | | |
| 7 | 533 Relative Offset | | | |
| 8 | 534 Streaming Control | | | |
| 9 | 535 FC Transfer Pointers | | | |
| 10 | 536 SATA Transfer Pointers | | | |

*Fig. 6a. Context Descriptor Entry Structure*

| Bits | | | |
|---|---|---|---|
| 31:24 | 23:16 | 15:8 | 7:0 |
| 535d FSDBP | 535c FSO | 535b FLV | 535a FC LBP |

*Fig. 6b.*

| Bits | | | |
|---|---|---|---|
| 31:24 | 23:16 | 15:8 | 7:0 |
| 536d LSDBP | 536c LSO | 536b SLV | 536a SATA LBP |

| Bits | | | |
|---|---|---|---|
| 31:24 | 23:16 | 15:8 | 7:0 |
| 534d | 534c | 534b | 534a |

| Bit | | | | | | | |
|---|---|---|---|---|---|---|---|
| 31 | 30 | 29 | 28 | 27 | 26 | 25 | 24 |
| 534[31] DV | 534[30] PC | 534[29:24] USEG | | | | | |

| Bit | | | | | | | |
|---|---|---|---|---|---|---|---|
| 23 | 22 | 21 | 20 | 19 | 18 | 17 | 16 |
| 534[23] NV | 534[22] Rsv | 534[21] Rsv | 534[20:16] NST | | | | |

| Bit | | | | | | | |
|---|---|---|---|---|---|---|---|
| 15 | 14 | 13 | 12 | 11 | 10 | 9 | 8 |
| 534[15] FC Streaming | 534[14] DR | 534[13] SB | 534[12] DS | 534[11] SO | 534[10] PR | 534[9] WS | 534[8] XOR |

| Bits | | | | | |
|---|---|---|---|---|---|
| 31:26 | 25 | 24 | 23 | 22:12 | 11:0 |
| Reserved | 524e NDBPV | 524d E | 524c V | 524b Next Data Buffer Pointer (NDBP) | 524a Current Segment Payload Size (CSPZ) |

*Fig. 8a. Data Buffer Link Table Entry Structure*

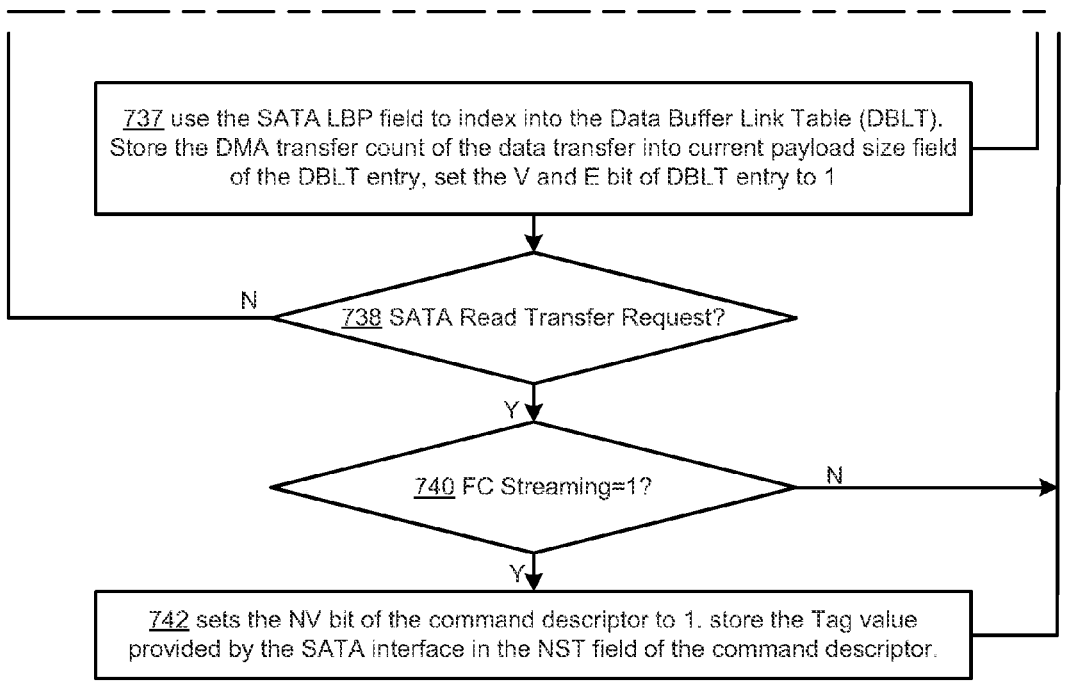
Fig. 10a(ii)
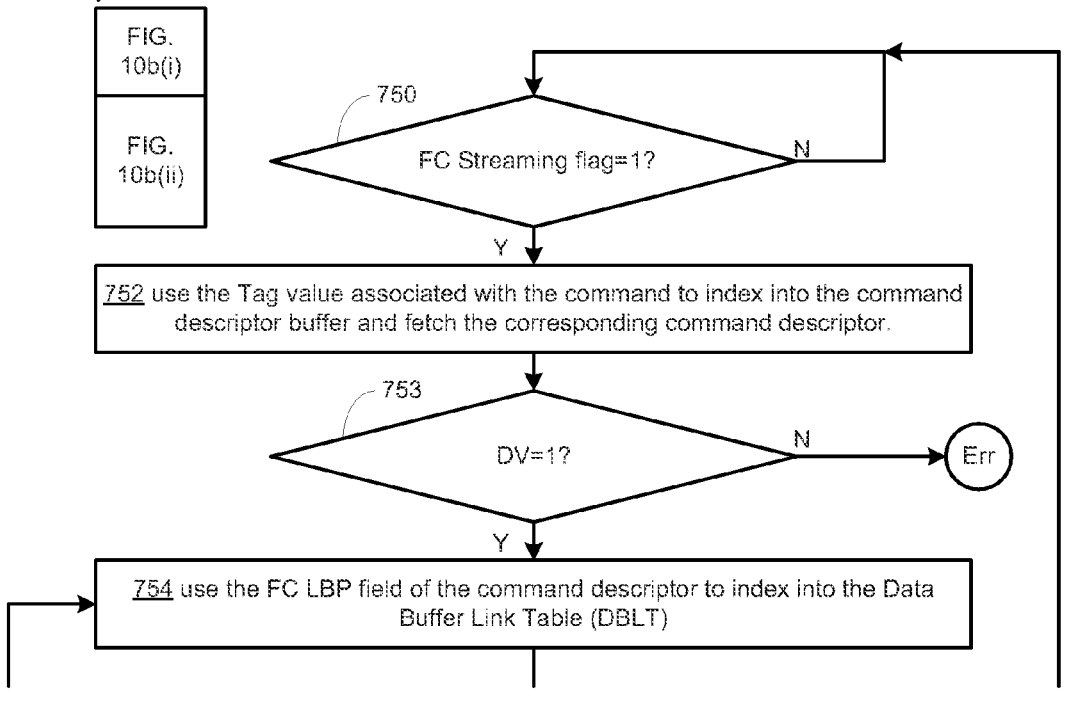
Fig. 10b(i)

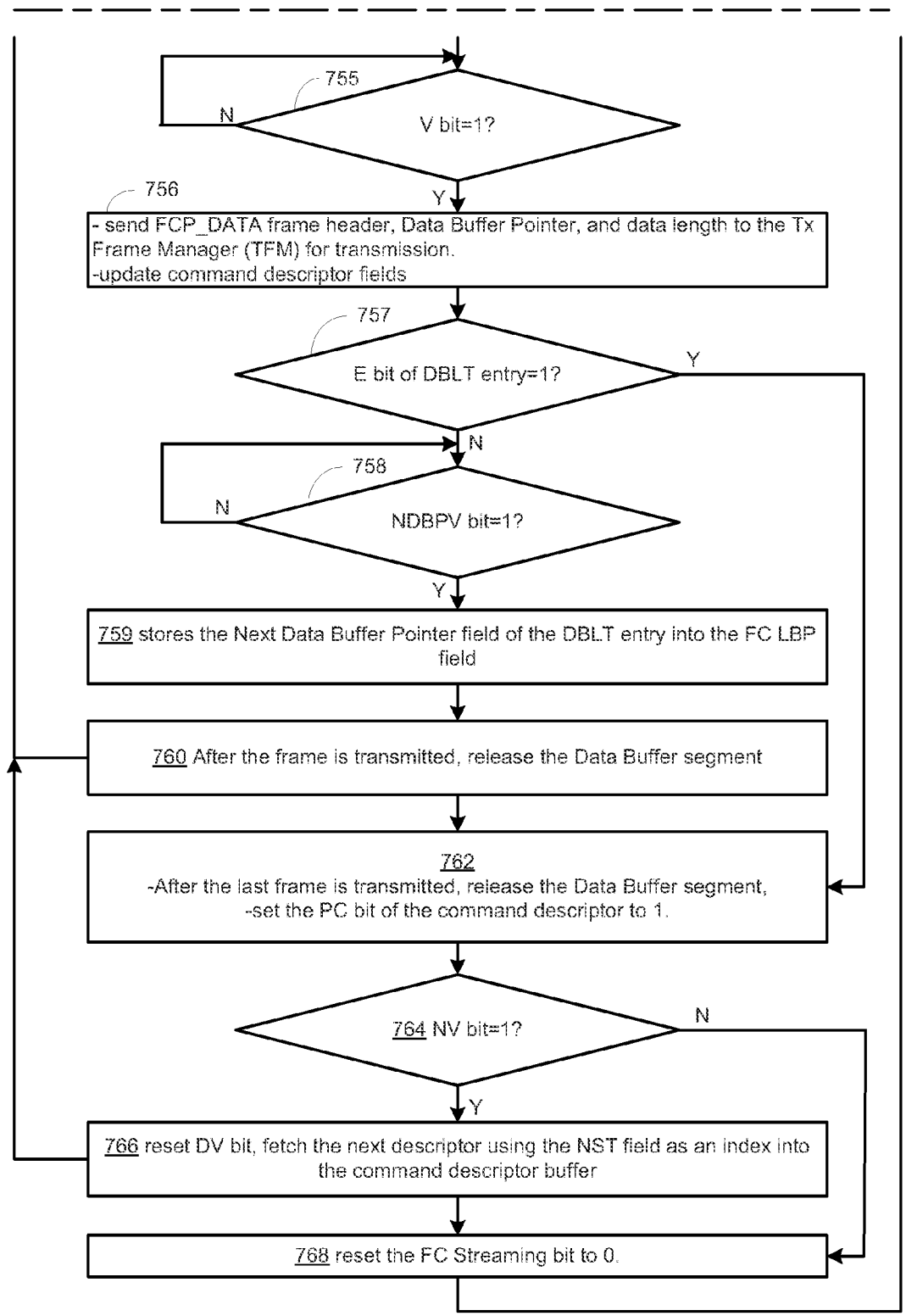
Fig. 10b(ii)

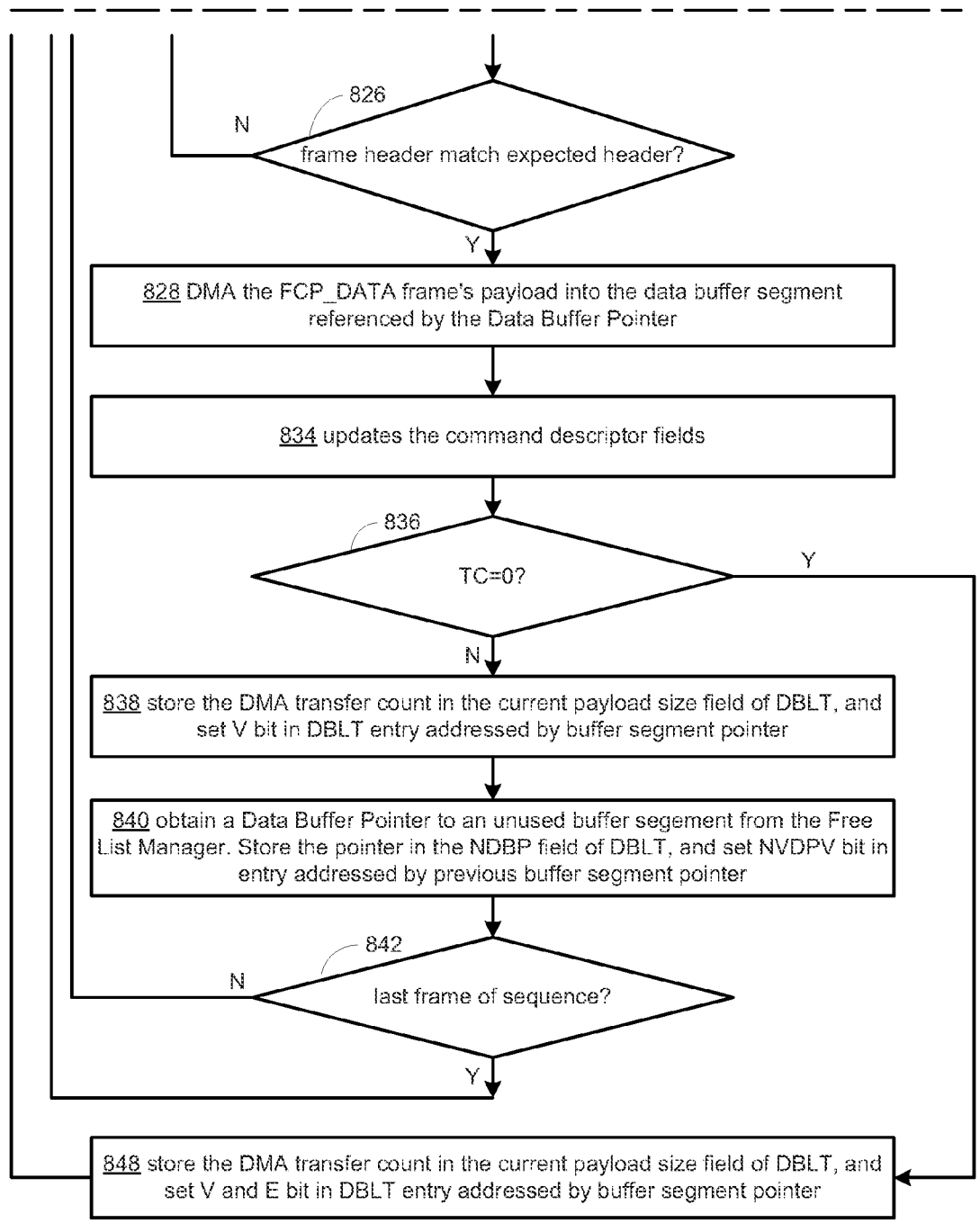
Fig. 11a(ii)

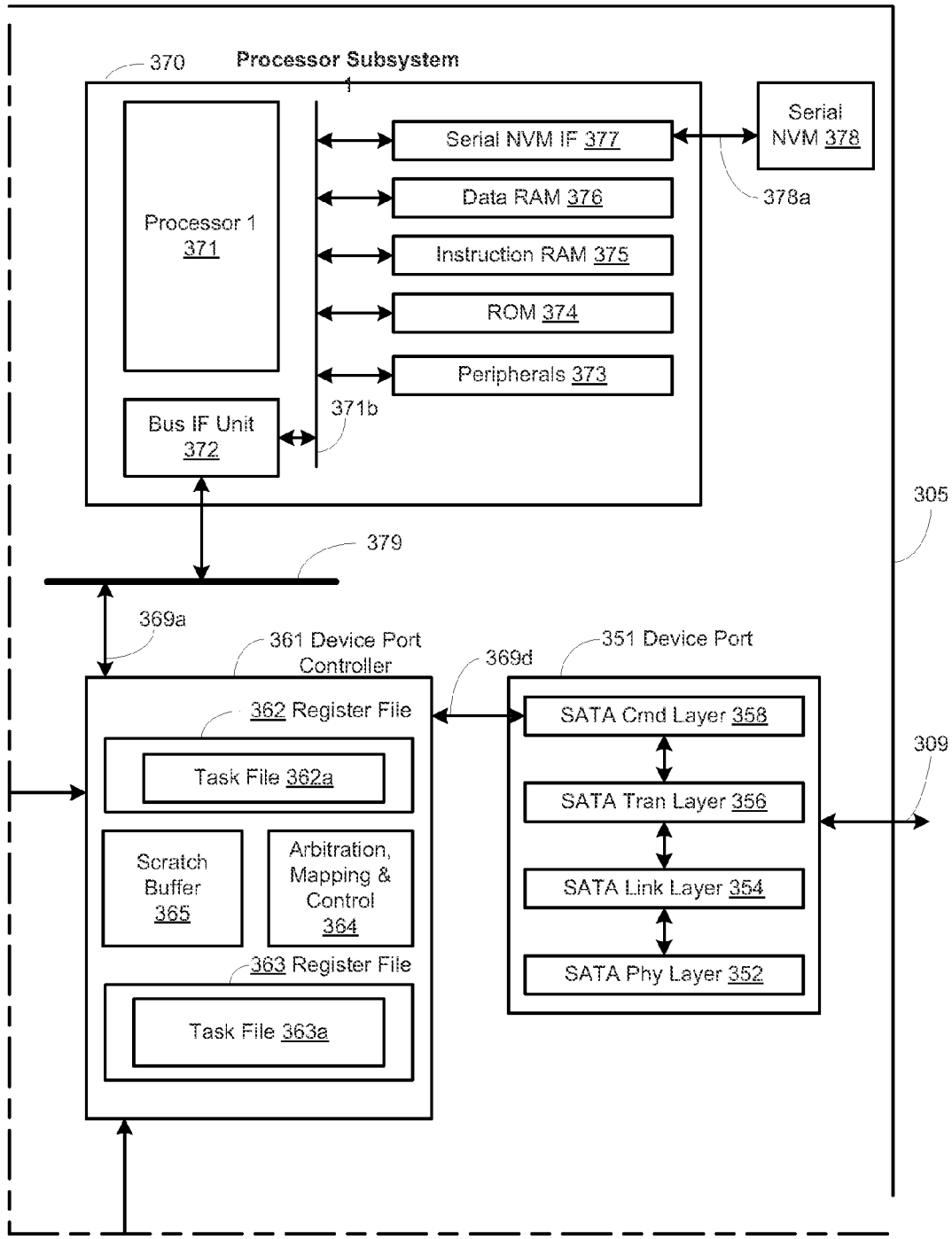
Fig. 12(iii)

HIGH PERFORMANCE ARCHITECTURE FOR FIBER CHANNEL TARGETS AND TARGET BRIDGES

CROSS REFERENCE TO RELATED APPLICATION

This application is a continuation-in-part of my previously-filed U.S. patent application Ser. No. 10/986,732, filed on Nov. 12, 2004 now U.S. Pat. No. 7,526,587 and entitled "Dual Port Serial Advanced Technology Attachment (SATA) Disk Drive", which is a continuation-in-part of my U.S. patent application Ser. No. 10/775,523, filed on Feb. 9, 2004 now U.S. Pat. No. 7,539,797 and entitled "Route Aware Serial Advanced Technology Attachment (SATA) Switch" and is a continuation-in-part of my U.S. patent application Ser. No. 10/775,521, filed on Feb. 9, 2004 now U.S. Pat. No. 7,523,235 and entitled "Switching Serial Advanced Technology Attachment (SATA)", and is a continuation-in-part of my U.S. patent application Ser. No. 10/775,488, filed on Feb. 9, 2004 now U.S. Pat. No. 7,523,235 and entitled "Serial Advanced Technology Attachment (SATA) Switch", the disclosures of which are incorporated herein as though set forth in full.

FIELD OF THE INVENTION

The present invention relates generally to Fiber Channel (FC) target devices and in particular to target devices with dual FC ports and target bridge devices with dual FC ports that bridge the FC ports to another protocol such as Serial Advanced Technology Attachment (SATA) or Serial Advanced Technology SCSI (SAS) and achieving near maximum number of input/output (I/O) operation per second (IOOPS).

BACKGROUND OF THE INVENTION

A "device" as used herein refers generally to a peripheral adhering to any known standard adopted by the industry. The term "target", as used herein refers generally to a peripheral device, such as a hard drive, tape or any other such known devices. The term "target bridge", as used herein is a network device coupled to a target via a target interface such as SATA or SAS and one or more hosts through a serial interface capable of performing protocol conversion, converting serial interface to SATA protocol for communication with the target SATA is a high-speed serial link replacement for the parallel Advanced Technology Attachment (ATA) attachment of mass storage devices. The serial link employed is a point-to-point high-speed differential link that utilizes multi-gigabit technology and 8b/10b encoding known to those of ordinary skill in the art. The SATA protocol is based on a layered communication model similar to Open Systems Interconnection (OSI) Reference Model. An overview is presented below. For more detail, the reader is referred to the SATA standard incorporated herein by reference. The SATA specification is provided in the publication entitled "Serial ATA: High Speed Serialized ATA Attachment" Revisions 1.0, dated Aug. 29, 2001, and the publication entitled "Serial ATA II: Extensions to Serial ATA 1.0", Revision 1.0, dated Oct. 16, 2002, both of which are currently available at Serial ATA work group web site www.serialata.com.

The serial ATA link is defined by a protocol pursuant to a known standard, having four layers of communications, the physical layer for performing communication at a physical level, a link layer, a transport layer and an application layer or sometimes referred thereto as a command layer. A transmitter and a receiver, cannot directly communicate the latter with each other, rather, they must go through the other layers of their system prior to reaching a corresponding layer of the other. For example, for the physical layer of a transmitter to communicate with the transport layer of the receiver, it must first go through the link, transport and application layers of the transmitter and then through the serial ATA link to the application layer of the receiver and finally to the transport layer of the receiver. The basic unit of communication or exchange is a frame. A frame comprises of a start of frame (SOF) primitive, a frame information structure (FIS), a Cyclic Redundancy Checksum (CRC) calculated over the contents of the FIS and an end of frame (EOF) primitive. The serial ATA organization has defined a specification in which the definition of a frame is provided and which is intended to be used throughout this document. Primitives are double word (Dword) entities that are used to control and provide status of the serial line. The serial ATA organization has defined a specification in which the definition of allowed Primitives is provided and which is intended to be used throughout this document.

Fibre Channel (FC) is a standards-based networking architecture. The ANSI (American National Standards Institute) T11X3 committee is the governing body for FC standards. FC standards define a multilayered architecture for moving data across the network. The lower two layers, FC-1 and FC-0 also referred to as FC-Physical layer (FC-Phy) define media types, signaling, allowable lengths and media access. The FC-2 layer also referred to as link layer (FC-LL) defines how blocks of data will be segmented into sequence of frames, framing protocol, classes of service and flow control. The top layer FC-4 establishes interface between FC and the upper-level application The topologies supported by fiber channel protocol include point-to-point, arbitrated look and switched fabric topologies. The Fiber Channel Arbitrated Loop (FC-AL) provides a middle ground between the point-to-point and fabric allowing connecting up to 126 ports on a single loop. In FC-AL, the transmit output of one port is connected to the receive input of the next. The process of connecting transmit output to receive output continues until a closed loop is formed. Problems inherent in any ring topology such as troubleshooting faulty lines or transceivers along the loop, connecting disconnecting devices to/from the loop promoted the development of centralized Arbitrated Loop (AL) hubs. AL hubs provide a physical star topology for a loop configuration, bringing each port's transmit and receive to a common location. The internal circuitry of a AL hub completes the required connections. One of the most useful features of a hub is bypass circuitry at each port, which allows the loop to circumvent a disabled or disconnected node while maintaining operation.

To prevent the potential for frame loss due to lack of available receive buffers at a port, fiber channel causes different levels of flow control to pace the rate at which the sender or transmitter is allowed to transmit frames. The first is a link level protocol called buffer-to-buffer (and a variation of buffer-to-buffer flow control used on virtual circuits called virtual circuit flow control) and an end-to-end flow control. All flow control protocols use a concept referred to as credit. Credit, as used herein, is defined as permission granted by a receiving port to a sending port to send a specified number of frames.

The number of frames that may be sent is referred to as available credit. As long as a port has a nonzero available credit, it has permission to send a number of frames equal to that of available credit. When a frame is sent, the available credit is decremented. When a response is received, the available credit is replenished. If the available credit reaches zero, frame transmission is suspended until the available credit is replenished to a nonzero value. Credit may be obtained in several ways depending upon class of service and topology. Transmission credit is initially established when two communicating nodes log in and exchange communication parameters. End-to-end flow control (EE_Credit) is used by Class 1 and Class 2 service between two end nodes and is monitored by the nodes themselves. An intervening switch does not participate in EE_Credit. Once an initial credit level is granted, the replenishment of credits is accomplished by acknowledgements (ACKs) issued by the receiver to the sender. The sender decrements the EE_Credit by 1 for each frame issued and increments only when an ACK is received. Buffer-to-buffer credit (BB_Credit) is issued by Class 2 and Class 3 services and relies on the receiver-ready (R_RDY) ordered set to replenish credits. BB_Credit has no end-to-end components. A sender decrements the BB_Credit by 1 for each frame sent and increments BB_Credit by 1 for each R_RDY received. The initial value of BB_Credit must be nonzero. In Arbitrated Loop, a different BB_Credit scheme is used. The BB_Credit assumes that the BB_Credit of a device is zero. The target node does not establish a positive BB_Credit until it is opened for a transaction by an initiator. The target then issues a number of R_RDYs equivalent to the receive buffer it has available. The differentiating feature of this BB_Credit is that an initiator does not have to maintain a table of BB_Credite values for potentially a large number of targets on the loop.

Fiber Channel Protocol (FCP) defines the mapping of popular SCSI command protocol to use fibre channel interface. This is the most widely used protocol mapping due to the popularity of the SCSI protocol combined with capabilities of fibre channel. The FCP mapping of SCSI to fibre channel defines information sets that are transferred between initiator and target. The information sets include: FCP_CMND, FCP_XFER_RDY FCP_DATA and FCP_RSP.

The FCP_CMND information set defines the data structure containing the SCSI command Descriptor Block and other command related information.

The FCP_XFER_RDY information set specifies the relative offset and length of the following data sequence.

The FCP_DATA information set is used to transfer data between an initiator and a target. The data may be sent as a single FCP_DATA information set, or broken up into multiple information sets.

The FCP_RSP information set defines the data structure containing the status response and signals the completion of command.

FIG. 1a shows a system 100 using a target bridge device 105. The system 100 is shown to include a host 101 coupled to a fibre channel (FC) Host Bus Adaptor (FC HBA) 103, the FC HBA 103 is shown to be coupled to a host port 111 of the target bridge device 105 via a FC link 107 and a host 102, which is shown coupled to a FC HBA 104, which is shown coupled to a host port 131 of the target bridge device 105 via a FC link 108. The device port 151 of the target bridge device 105 is shown coupled to a storage unit 106, such as a hard disk drive (HDD) or a tape drive or optical drive via a SATA link 109. The storage unit 106 is an example of a device.

FIG. 1b shows a system 110 using dual FC_AL loops to network plurality of SATA HDDs via target bridge devices. The system 110 is shown to include a host 101 coupled to a fibre channel (FC) Host Bus Adaptor (FC HBA) 103, the FC HBA 103 is shown to be coupled to a AL Hub 117 via a FC link 107 and a host 102, which is shown coupled to a FC HBA 104, which is shown coupled to a AL Hub 118 via a FC link 108. The AL Hub 117 is shown coupled to FC ports of target device bridges 115a thru 115h. The AL Hub 118 is shown coupled to FC ports of target device bridges 115a thru 115h. The target bridge devices 115a thru 115h are shown coupled to storage units 116a thru 116h respectively via SATA links.

A target bridge 205 of prior art described in U.S. patent application Ser. No. 10/986,732, filed on Nov. 12, 2004 and entitled "Dual Port Serial Advanced Technology Attachment (SATA) Disk Drive", is shown in FIG. 2. The target bridge 205 is shown coupled to a host 201 via a FC HABA 203 and FC link 207, host 202 via a FC HABA 204 and FC link 208, and a HDD 206 via a SATA link 209. The target bridge 205 is shown to include a FC port 211 coupled to a FC link 207, a FC port 231 coupled to a FC link 208, a device port 251 coupled to a SATA link 209, a device port controller 261, and a controller 270. The FC port 211 and 231 are shown to include a command (CMD) queue 226 and 246 for queuing FCP commands. The device port 251 is shown to include a SATA Phy layer 252, a SATA link layer 254, a SATA transport layer 256, a SATA command layer 258 for managing the SATA link 209. The device port controller is shown to include a task file 262 and a mapping circuit 264 for mapping host tags to SATA device tags and visa versa. The controller 270 is coupled to device port controller 261, FC port 211 and FC port 231 via interfaces 269, 279 and 289 respectively. The controller 270 managing FC port 211, FC port 231 and protocol conversion between FCP and SATA, and other functions typically performed by such a controller.

While the early generation of FC supported data rates of 100 Mega Bytes per Second (MBs) the current generation must support data rates of 100, 200 and 400 MBs and future generations are adapted to support 100, 200, 400 and 800 MBs and higher data rates. As data rates increase, the time to process frames is reduced. For example, at data rate of 100 MBs and a frame with a pay load of 2048 bytes, the frame transmission/reception will take about 21 usec and at data rate of 400 MBs, it will be reduced to about 5 usec. The target bridge needs to be able to manage frames without affecting performance. It is desirable that target bridge provide scalability from 100 MBs to 800 MBs without substantially affecting performance as measured by the number of Input/Output Operations Per Second (IOOPS). It is further desirable that such scalability is achieved with cost effective architecture.

Thus, there is a need for architecture and a method for use in dual port fiber channel target devices thereby enhancing scalability and performance. "Performance", as used herein, refers to the number of input/output operations per second.

There is a further need to provide a method and architecture for substantially reducing the manufacturing costs and maintaining scalability and performance.

SUMMARY OF THE INVENTION

The invention incorporates features to eliminate or minimize real time response by processor to meet performance as measured by IOOPS and latency.

Storage devices, such as HDDs, are electromechanical devices with typical large latency due to seek time in command execution, storage devices typically support command queuing to allow performance optimization such as seek optimization. With a large FC command queue, the processor can process received commands in the background while the processor is waiting for an HDD response, and appropriately send queue commands to the HDD. A large FC command queue requires a large Rx buffer. One aspect of present invention include an apparatus and method for reducing size of required buffer while maintaining a large FC command queue. Another aspect of present invention eliminates processor intervention in data transfer phase of command execution.

Briefly, an embodiment of the present invention includes a dual port fiber channel target device including a single processor subsystem with high performance. One aspect of the invention is an apparatus and method for a dynamic credit management to allow host to send a large number of commands without requiring the total buffer size to exceed the command queue size. Another aspect of invention include an architecture, apparatus and method to offload the processor subsystem for managing data transfer associated with command execution.

IN THE DRAWINGS

FIG. 5a shows details of the Rx frame descriptor.

FIG. 5b shows details of word 1 of the Rx frame descriptor 510 of FIG. 5a.

FIG. 5c shows details of word 1 bits [31:24] of the Rx frame descriptor.

FIG. 6a shows the structure of a Context Descriptor.

FIG. 6b, show details of word 9 of the Context Descriptor of FIG. 6a.

FIG. 6c shows details of word 10 of the Context Descriptor of FIG. 6a.

FIG. 6d shows details of word 8 of the Context Descriptor of FIG. 6a.

FIG. 7a, show details of word 8 bits [31:24] of the Context Descriptor of FIG. 6a.

FIG. 7b shows details of word 8 bits [23:16] of the Context Descriptor of FIG. 6a.

FIG. 7c shows details of word 8 bits [15:8] of the Context Descriptor of FIG. 6a.

FIG. 8a shows the structure of Data Buffer Link Table Entry.

FIG. 10a, 10b show a flow chart of a streaming read operation.

DETAILED DESCRIPTION OF THE PREFERRED EMBODIMENTS

Figure 3I:
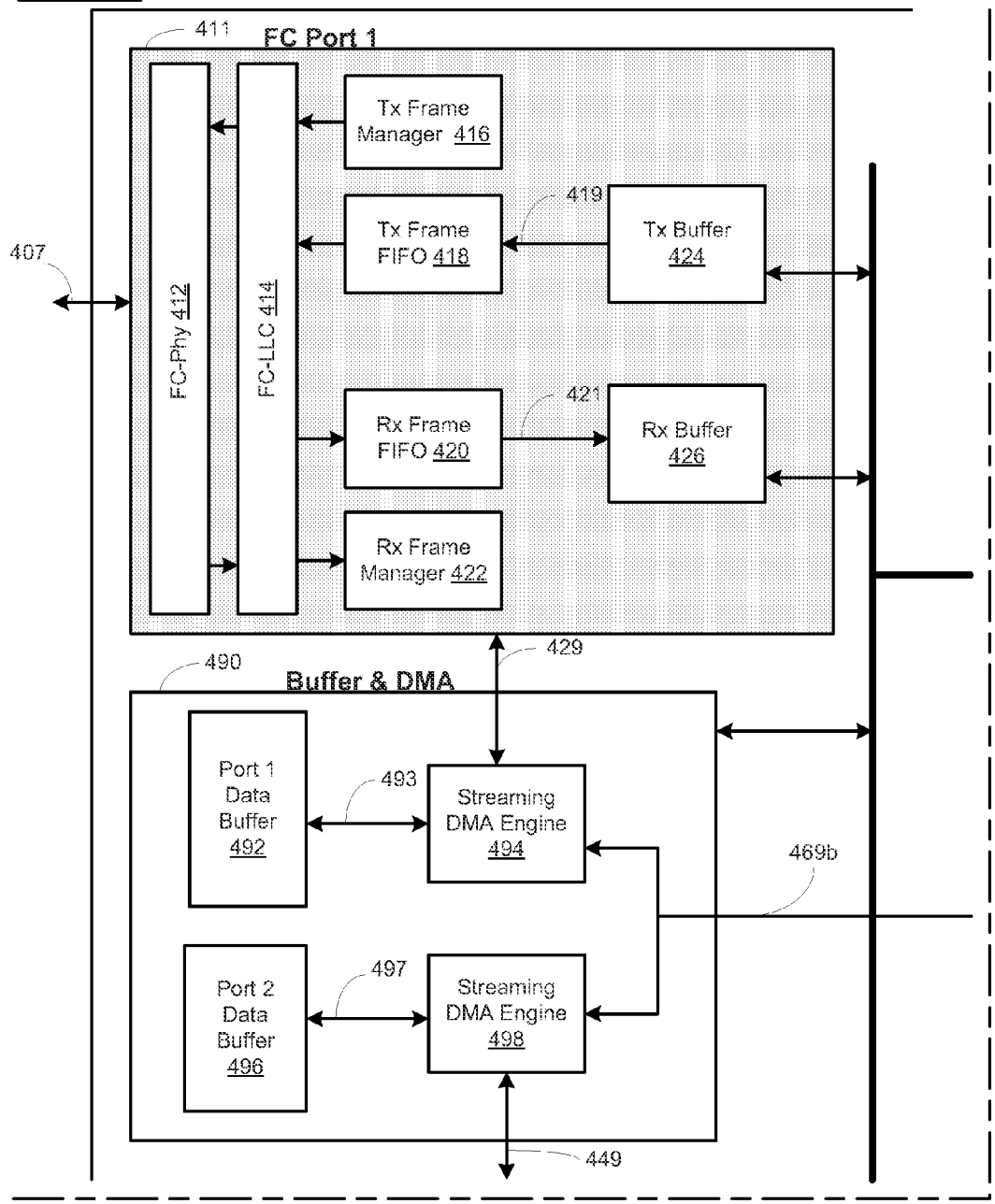
FIG. 3 illustrates a fiber channel target device 405 in accordance with an embodiment of the present invention.
Figure 3:
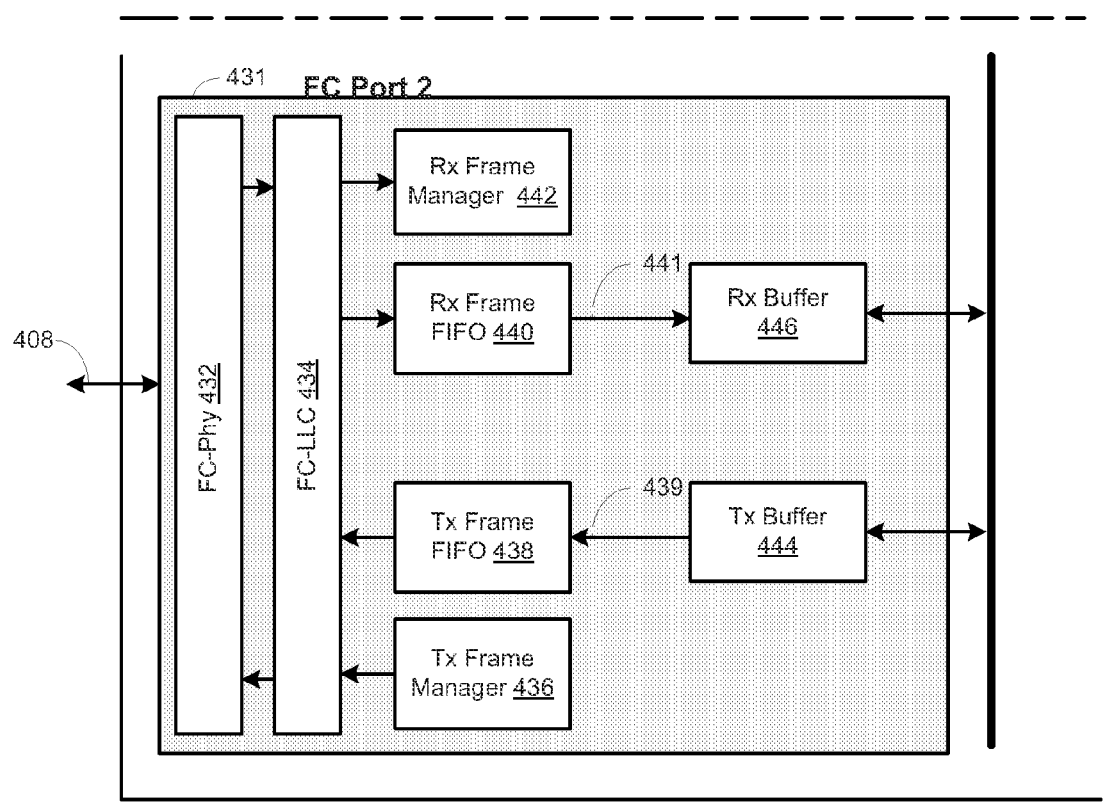

FIG. 3 shows a fibre channel (FC) target bridge 405 using single microprocessors. The target bridge 405 is shown to include a FC port 411, a FC port 431, device port 451, a device port controller 461, a buffer and DMA 490, a processor subsystem 470. The target bridge 405 is shown to include a FC link 407 coupled to FC port 411, a FC link 408 coupled to FC port 431, and a SATA link 409 coupled to device port 451.

The processor subsystem 470 is shown to include a processor 471, coupled via bus 471b to a bus interface (IF) unit 472, an instruction Random Access Memory (RAM) 475, a data RAM 476, a Read-Only-Memory (ROM) 474, a serial non-volatile-memory (NVM) IF 477, and one or more peripherals 473. The serial NVM IF 477 is shown coupled to a NVM 478 through a serial interface 478a. In an alternative embodiment, the instruction RAM 475 and data RAM 476 are combined into a single RAM structure. The instruction RAM 475 is generally for storing instructions or firmware or software code, such that when executed, direct the performance of one or more tasks.

Instructions, such as computer software or firmware code, is loaded into the instruction RAM 475 from the serial Flash 478 via serial Flash IF 478a upon powering on of the system or initialization thereof. This allows instructions to be executed from a fast memory (i.e. RAM) to avoid wait states and allows single cycle execution of instructions. In alternative embodiments, a parallel NVM interface is used for achieving the same. Examples of NVM include Flash Memory or EEPROM or any other type of memory capable of maintaining data or information stored therein even when power is not supplied thereto. The bus interface unit 472 couples the processor subsystem 470 to external units via the bus 479. Examples of peripherals or external units include an interrupt controller, a General Purpose IO (GPIO) controller, Timer units, Clock generation units, a serial interface unit, and parallel interface unit.

The FC port 411 is shown coupled to the FC link 407 and includes a fiber channel physical layer (FC-Phy) 412, a fiber channel link layer controller (FC-LLC) 414, a transmit frame manager 416, a transmit (Tx) frame first-in-first-out (FIFO) 418, a receive (Rx) frame FIFO 420, and a receive (Rx) frame manager 422 coupled together as shown in FIG. 3. The transmit (Tx) buffer 424 is shown coupled to the Tx frame FIFO 418 via the bus 419. The receive (Rx) buffer 426 is shown coupled to the Rx frame FIFO via the bus 421. The processor subsystem 470 accesses the Tx buffer 424, Rx buffer 426, configuration, control and status registers in the Tx Frame manager 416, the Rx frame manager 422, FC-LLC 414 and the PC-Phy 412 via the bus IF unit 472 and the bus 479.

The structure and coupling of the FC port 431 and all of the other FC port 431 devices are similar to that described hereinabove with respect to the FC port 411. That is, the FC port 431 is shown to be coupled to a FC link 408 and includes a FC-Phy 432, a FC-LLC 434, a Tx frame manager 436, a Tx frame FIFO 438, a Rx frame FIFO 440 and a Rx frame manager 442 coupled together as shown in FIG. 3. The Tx buffer 444 is shown coupled to the Tx frame FIFO 438 via the bus 439. The Rx buffer 446 is shown coupled to the Rx frame FIFO 440 via the bus 441. The processor subsystem 470 accesses the Tx buffer 444, the Rx buffer 446, configuration, control and status registers in the Tx Frame manager 436, the Rx frame manager 442, the FC-LLC 434 and the FC-Phy 432 via the bus IF unit 472 and the bus 479.

The buffer and DMA 490 is shown to include a data buffer 492 coupled to a Streaming DMA engine 494 via the bus 493 and a data buffer 496 coupled to a Streaming DMA engine 498 via the bus 497.

The device port 451 is shown to include a SATA Phy Layer 452, a SATA Link Layer 454, a SATA Transport Layer 456, and a SATA command layer 458. The device port 451 is shown coupled to a SATA link 409. The device port controller 461 is shown to include a register file 462, which is shown coupled to the SATA Command Layer 458 via the bus 469d. The device port controller 461 is further shown to include a mapping and control circuit 464 and a scratch buffer 465. The register file 462 is further shown to include a Task file 462a.

The device port controller 461 is coupled to the buffer and DMA circuit 490 via the bus 469b. The processor subsystem 470 accesses configuration, control and status registers in the device port controller 461 via bus IF unit 472 and the bus 479.

Information received, processed and transmitted by the device FC ports 411 and 431 is generally in the form of frames. Frames include, but are not limited to, header, payload and CRC field. Frame types include, but are not limited to, command frames, basic link services or extended link services (collectively link services) frames, common fibre channel service frames, arbitrated loop initialization frames and data frames.

The Rx operation of FC port 411 will be discussed next. The FC port 411 appends a Rx frame control word to the header of received frames and stores the result in the Rx buffer 426. For command, link services, or arbitrated loop initialization frames, the frame payload is stored in the Rx buffer 426. For all other frames, the payload is stored in the data buffer 492. The Rx frame descriptor specifies the structure of the Rx frame in the Rx buffer 426. FIG. 5a shows the Rx frame descriptor 510 used in the embodiment of this invention. The Rx frame descriptor 510 includes a control word 511, the received frame header 510a comprising words 2 thru 7 of the Rx frame descriptor 510, and an optional frame payload 518. In FIG. 5b, the control word 511 is shown to include a plurality of fields. A flag field 511d includes a plurality of flags. A payload size field 511c in the Rx frame control word 511 indicates the frame payload size. A buffer pointer field 511a in the Rx frame control word specifies the starting address in the data buffer 492 if the payload is stored in the data buffer 492. The flag field 511d is shown in FIG. 5c. The flag field 511d is shown to include a DV field 511[31] for indicating the validity of the frame, a DP field 511[30] for indicating whether or not the payload of the frame is stored following the frame header in the Rx buffer 426 or whether it is stored in the data buffer 492, a FCMD field 511[29] for indicating that the received frame is a command. The flag field 511d also includes a SOF type field 511[28:26] and a EOF type 511[25:24] field which indicate the type of start and end of frame received, respectively. The processor can determine the frame class from the SOF type 511[28:26] and the EOF type 511[25:24] in the frame descriptor 510.

Figure 1A:
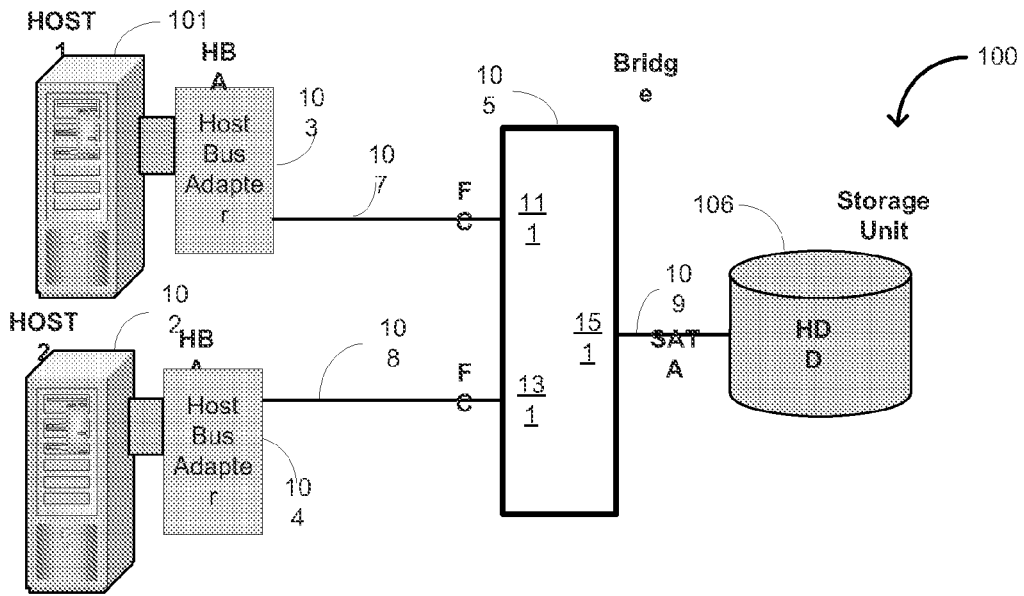
FIG. 1a shows an example of a fiber channel target bridge system 100 in a point-to-point topology.
Figure 4A:
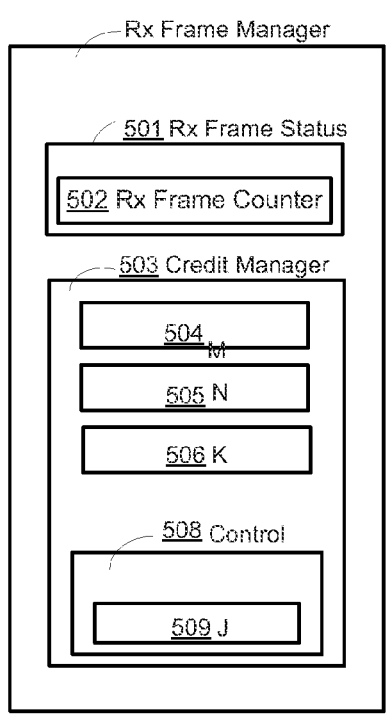
FIG. 4a shows a block diagram of Rx Frame Manager.
Figure 2I:
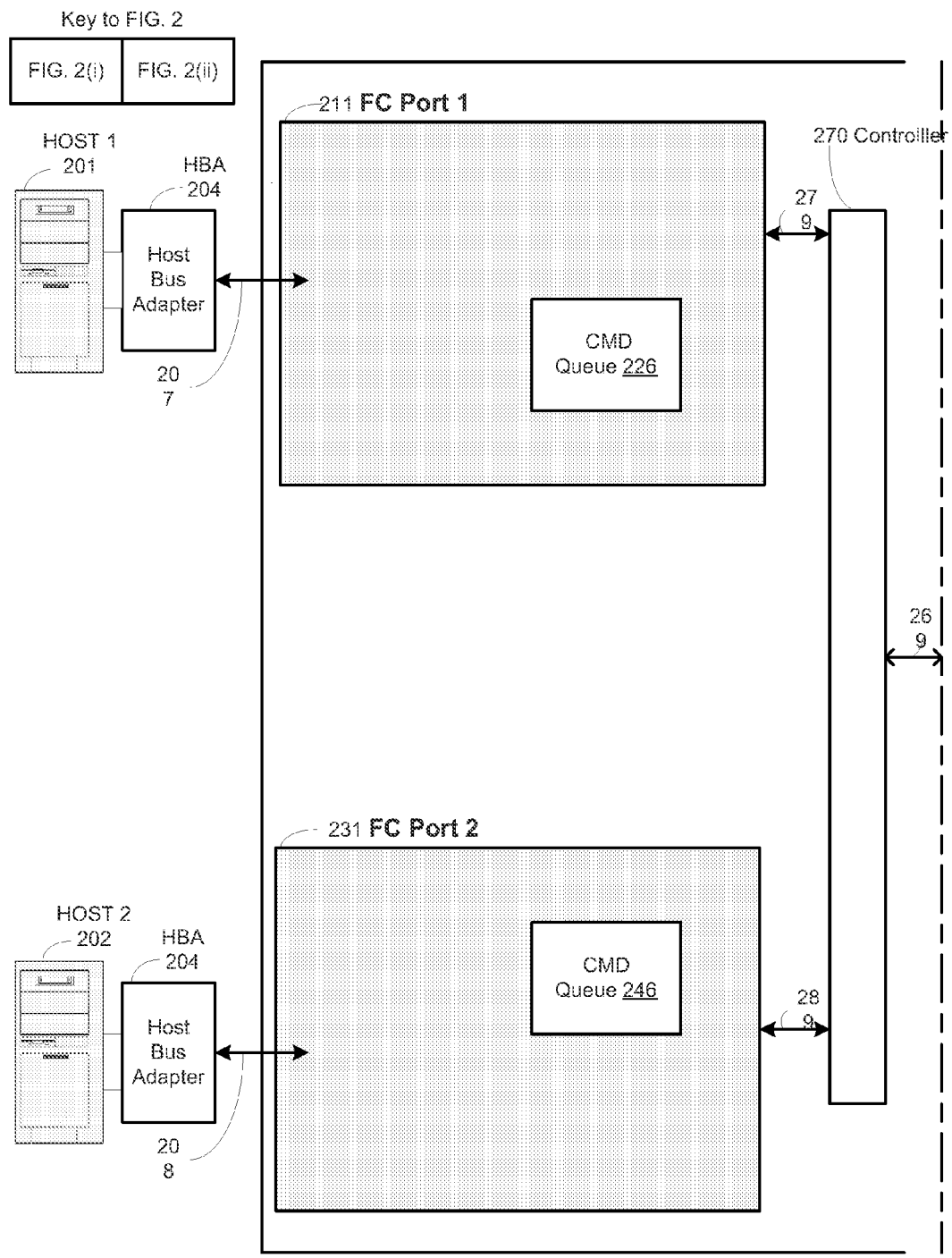
FIG. 2 shows a prior art fiber channel (FC) target device 205.
Figure 2:
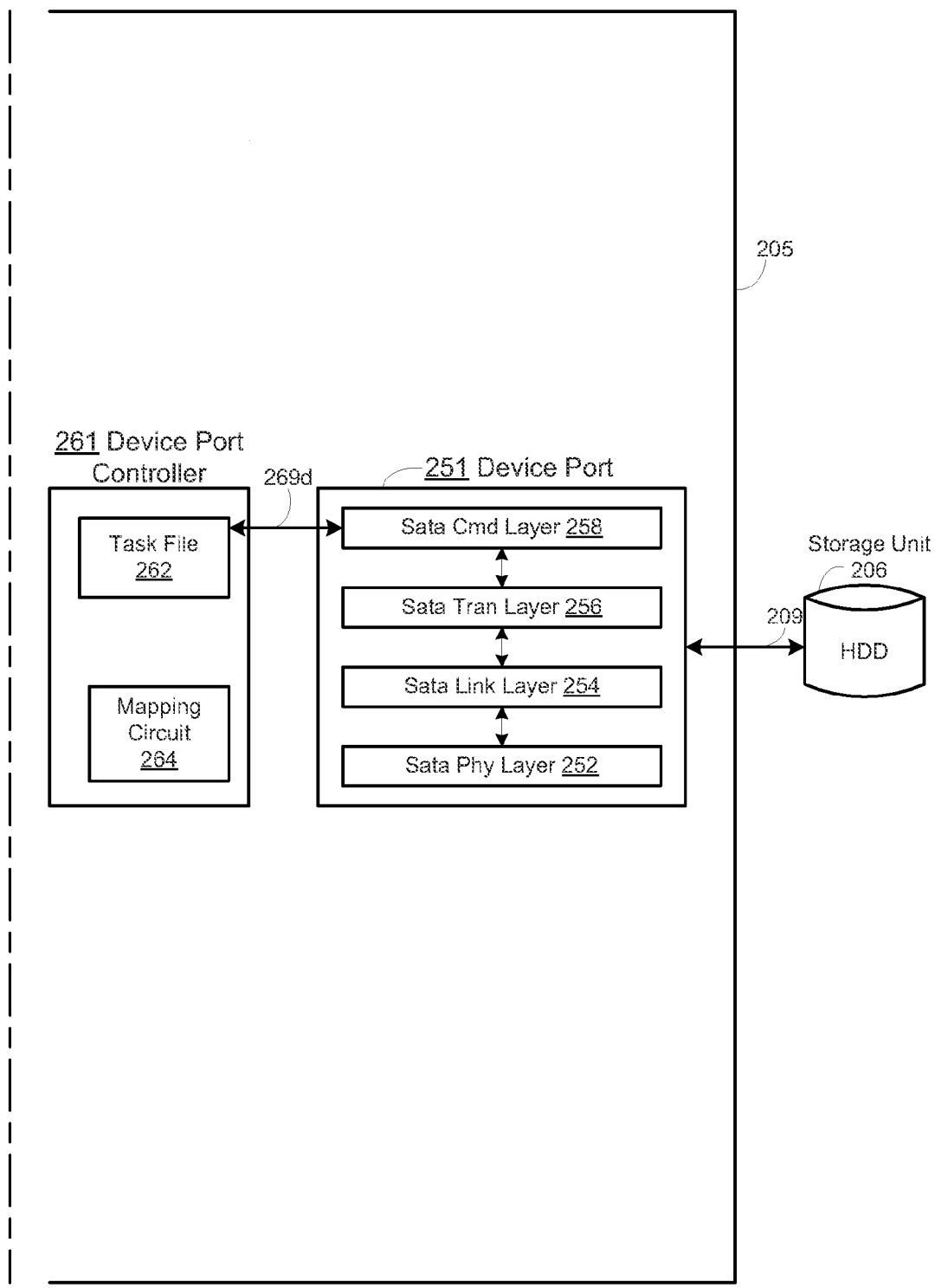

In FIG. 4a, the Rx frame manager 422 is shown to include a Rx frame status 501, a credit manager 503, and a control circuit 508. The controller device 508 issues credit to the host. The Rx frame status 501 includes an Rx frame counter 502 that keeps track of the number of frames in the Rx buffer 426. The control circuit 508 includes a control register J 509. The Rx frame counter 502 and control register J 509 are accessed and updated by the processor 471. The processor 471 maintains a Rx descriptor pointer 576a to access the Rx frame descriptors 510 in the Rx buffer 426. If the Rx frame counter 502 is non-zero, the processor 471 checks the DV field of the Rx frame descriptor 511[31]. If the DV bit 511[31] is set, the processor 471 checks if the FCMD field 511[29] of the Rx frame descriptor 510 is set. If set, the processor 471 validates the command and if validated, the processor 471 creates a task structure and queues the task to an internal command queue linked list 476b in the data RAM 476. The linked list 476b in the data RAM 476 is the equivalent of the CMD Queue 226 of FIG. 2. The processor updates the Rx descriptor pointer 476a to point to the starting address of the next descriptor. Periodically, the processor needs to release the Rx frame descriptors 510 to allow the FC port 411 to receive more frames. This is accomplished by writing the number of descriptors to be released along with a control bit to select either the releasing FCP command descriptors or non-command descriptors in a control register J 509.

The Rx operation of FC port 431 is similar to that described hereinabove with respect to the FC port 411. Referring back to FIG. 3, The FC port 431 appends a Rx frame control word to the header of received frames and stores the result in the Rx buffer 446. For command, link services, or arbitrated loop initialization frames, the frame payload is stored in the Rx buffer 446. For all other frames, the payload is stored in the data buffer 496.

The Rx frame descriptor specifies the structure of the Rx frame in the Rx buffer 446. As earlier described, FIG. 5a shows the Rx frame descriptor 510 used in the embodiment of this invention. The Rx frame descriptor 510 includes a control word 511, the received frame header 510a comprising words 2 thru 7 of the Rx frame descriptor 510, and an optional frame payload 518. In FIG. 5b, the control word 511 is shown to include a plurality of fields. A flag field 511d includes a plurality of flags. A payload size field 511c in the Rx frame control word 511 indicates the frame payload size. A buffer pointer field 511a in the Rx frame control word specifies the starting address in the data buffer 496 if the payload is stored in the data buffer 496. The flag field 511d is shown in FIG. 5c. The flag field 511d is shown to include a DV field 511[31] for indicating the validity of the frame, a DP field 511[30] for indicating whether or not the payload of the frame is stored following the frame header in the Rx buffer 446 or whether it is stored in the data buffer 496, a FCMD field 511[29] for indicating that the received frame is a command. The flag field 511d also includes a SOF type field 511[28:26] and a EOF type 511[25:24] field which indicate the type of start and end of frame received, respectively. The processor can determine the frame class from the SOF type 511[28:26] and the EOF type 511[25:24] in the frame descriptor 510.

Information received, processed and transmitted by the device FC ports 411, and 431 is generally in the form of frames. Frames include header, payload and CRC field. Frame types include command frames, link services frames, arbitrated loop initialization frames and data frames In FIG. 3, the command, link services frames and arbitrated loop initialization frames for FC ports 411 and 431 are stored in the Rx buffers 426 and 446 respectively while data and other types of frames are stored in the data buffers 492 and 496 respectively In FIG. 3, the Rx buffers 426 and 446 and data buffers 492 and 496 are generally large in size to account for many commands sent by an initiator, such as a host (not shown in FIG. 3). The size of these buffers, however, is not correlated with the size of the command frames. An example of the size of a command frame is 56 bytes (60 bytes including Rx control word) whereas the size of an example LS frame is 116 bytes (120 bytes including Rx control word) There is no way of knowing which type of frame is going to be received and this is the reason for a lack of correlation between the receive buffer size and the command frame size.

Whenever a 'credit' is provided by Rx frame manager, there need be assurances of enough or ample buffer size to accommodate the largest type of frame that may be received. In order to queue large number of commands, a large Rx buffer size is used for storing frames received from the initiator. Commands, once stored in the buffers 426 and 446, are provided to the microprocessor (or processor) 471 through the bus 479 for execution thereof by the microprocessor 471. In this manner, many commands are queued without risking potential loss of commands. This type of buffering and decoding of the commands removes the need for real-time processing by the microprocessor 471. It is for the foregoing reason that only one processor is needed rather than the two-processor approach of prior art devices/systems. However, a larger size buffer is required than that of prior art systems.

An example perhaps serves to better understand of the notion provided hereinabove. For the sake of assumption, suppose that 128 commands are to be queued. A credit is to be provided by Rx frame manager which indicates that a frame, may be received, however, as there is no way of knowing which type of frame is to be received, the device 405 must be able to accommodate even the largest of frame sizes, i.e. those of data or other types of frames. Thus, the size of the buffers 426 and 446 need be large enough to accommodate the largest of frame sizes.

Referring to the same example, to queue 128 commands, which each include 60 bytes, there is a requirement of 128×60 bytes or 7,680 bytes needed for storing the commands. However, to account for the largest size frame, i.e. data or other types of frames, which may each be 2076 bytes in size, a space of 128×2048+128×120=277,504 bytes or approximately 278 Kilo Bytes (KB) is required as the total buffer size (Rx buffer plus data buffer). Therefore, to ensure accommodations for the largest size frames, a total buffer size of about 278 KB is required.

However, the problem of large buffer sizes is resolved by the device 405 through dynamic credit allocation or credit management. That is, the size of the buffer is based, in part, upon the number of credits allocated plus extra buffer for queuing up to a maximum command queue. For example, if the buffer 426 or 446 is to store 128 command frames that are 60 bytes each and there is a credit of 30 provided, then a total buffer size of approximately 30×2048+[30×120+(128−30)× 60]=70,920 bytes or 71 KB is required. The size of the Rx buffer is [30×120+(128−30)×60]=9,480 bytes and the size of data buffer is 30×2048=61,440 bytes for a total buffer size of approximately 71 KB. In prior art systems, the total buffer size needs to be approximately 278 KB. There is therefore a substantial reduction of total buffer size with one of the embodiments of the present invention.

The Rx frame manager (RFM) maintains 3 counters to properly manage dynamic credit management. A counter M indicates the number of available command frames in Rx buffer. A counter N indicates the number of available frames other than command frames. A counter K indicates the difference between buffer available and credits issued for non-command frames after an open connection has been established.

Figure 9:
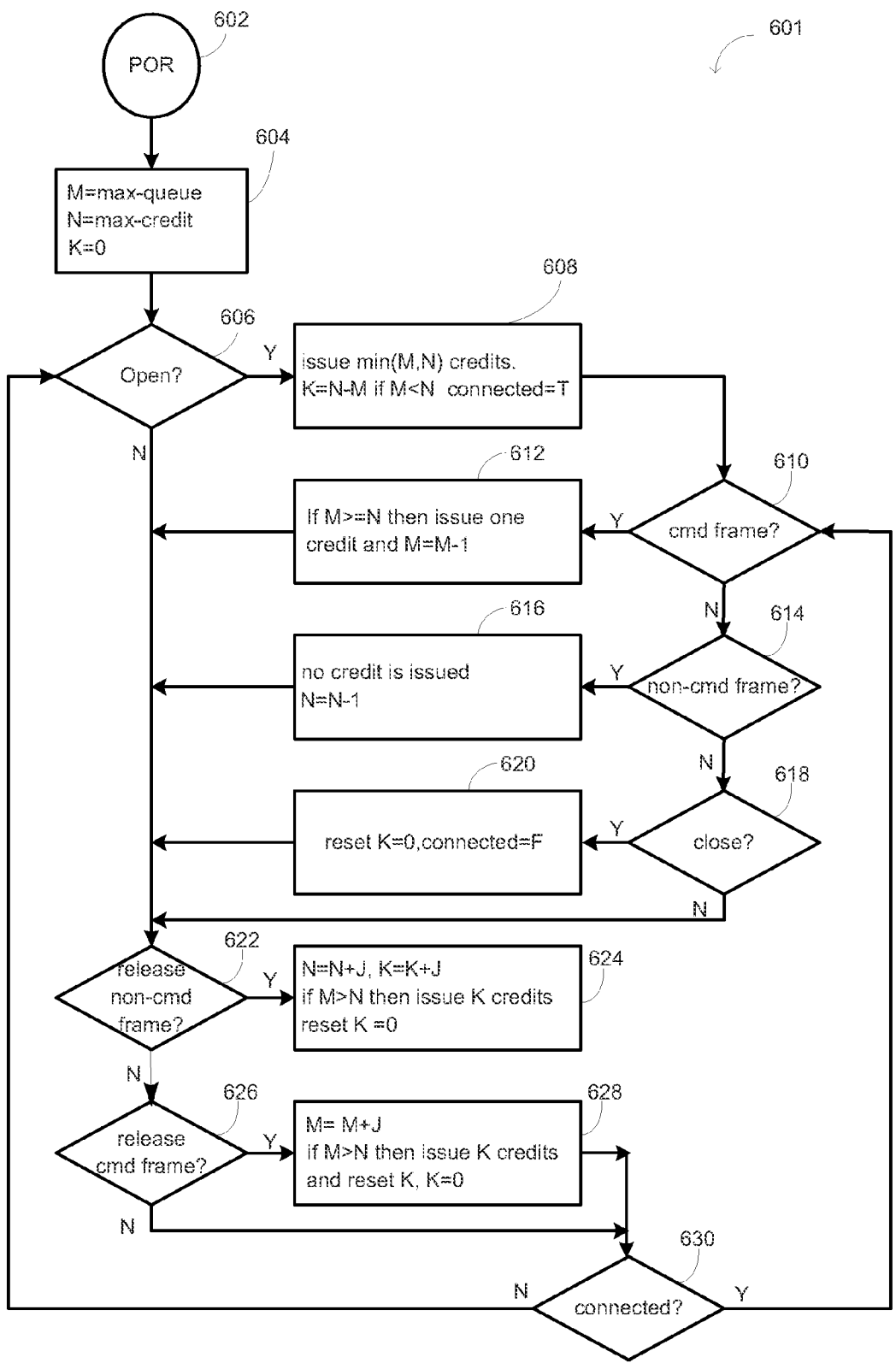
FIG. 9 shows a flow chart of a dynamic credit management.

A flow chart for dynamic credit management is shown in FIG. 9. On power-up reset (POR) 602, the counters are initialized at step 604 to an initial value of M, which is a max-queue size, N is initialized to max credit size and K is initialized to 0. At step 606, the RFM checks if a connection is established (opened), if opened then the process continues to step 608, otherwise the process continues to step 622. At step 608, RFM issues credit equal to minimum of M and N, and if M<N then K is set to N−M, otherwise, K is set to 0 and a connected flag is set to a logical value of one to indicate connection establishment, and the process continues to step 610. At step 610, the RFM checks if a command frame is received. If a command frame is received, the process continues to step 612, otherwise, the process continues to step 614 and checks if a non-command frame is received. At 614, if a non-command frame is received then the process continues to step 616, otherwise continues onto step 618 and checks if the connection is closed. If the connection is closed, the process moves to step 620, otherwise, the process continues to step 622 and checks if the processor has released non-command frames in the Rx frame buffer. If the processor released non-command entries in the Rx frame buffer, the process continues to step 624, otherwise, the process continues onto step 626 and checks if the processor has released the command frame in the Rx frame buffer. If the processor released command entries in Rx frame buffer, the process continues to step 628, otherwise, to step 630 and checks if the connected flag is set. If the connected flag is set, then the process goes back to step 610, otherwise, the process continues to step 606. At step 612, where a command frame was received, if M>=N, the RFM issues one credit and decrements M (M=M−1) and the process continues to step 622. At step 616, where a non-command frame was received, the RFM does not issue any credits and decrements N (N=N−1) and goes to step 622.

At step 620, where the connection is closed, the RFM resets K to zero and sets the connected flag to logical value of zero to indicate that the connection is removed and the process continues to step 622. At step 624, where the processor released J, non-command entries in the Rx frame buffer, the RFM adds J on N and K (N=N+J, K=K+J) and if M>N, then RFM issues K credits and resets K to zero, and the process continues to step 626. At step 626, where the processor released J, non-command entries in the Rx frame buffer, the RFM adds J on M (M=M+J), and if M>N, then RFM issues K credits and resets K to zero, and the process continues to step 630.

Since issuing large amount of credits (i.e. sending R_RDYs) is a delay-intensive process due to the transmission of frames by the Tx frame manager 416, the flow chart 601 can be modified to allow arbitration between the pending request from the Tx frames manger 416 and the credit manager 503. One such arbitration method is to first give priority to the credit manager 503 and after issuing a predetermined number of credits, the priority is given to the Tx frame manager 416 and after the frame transmission gives priority back to the credit manger, the process continues changing priority, as described hereinabove. There are many other arbitration schemes which fall within the scope of this invention. An example of credit management perhaps will serve to better understand the same.

For the sake of supposition, let us assume that M=128, N=32 and K=0 and that at the outset, 32 credits are granted with K=0. Lets suppose that 20 non-command frames are received by the device 405, then M=128, N=12, K=0 and the host has 12 remaining credits available.

Lets further suppose that 18 command frames are received, then M=110, N=12, K=0 and the initiator still has 12 remaining credits available since for each command that was received, the target hardware grants one credit to the host.

Now, assuming that execution of firmware by the microprocessor 470 has caused completion of processing of 8 non-commands and releases these entries or memory spaces within the receive buffer, i.e. the buffer 426 or 446, then M=110, N=20, and K=8. Since M>N, 8 credits are granted, K is reset to 0 and the initiator will have 20 credits available.

Suppose still further that execution of the firmware has caused completion of processing of 10 commands and has released the commands' entries, then M=120, N=20, and K=0. Since M>N but K=0, no additional credit is issued and the initiator or host has 20 available credits.

Dynamic credit management takes into consideration and processes the commands and link services frames so as to take advantage of actions dictated by the host. That is, for example, if following a command, the link services frame indicates aborting the command, obviously, such an action is taken with no further need for maintaining the command. To this end, the command frames and link services frames are stored together. Accordingly, the receive buffer 426 or 446 stores the command frame and LS/ELS but not the data frames.

Using the example above, initially, M is 128 and N is 16 and K is 0. When a connection is established minimum (M,N)= minimum (128, 16)=16 credits is issued. When the host (not shown in FIG. 4a) sends a command to the device 405, through the bus 407 or 408, so long as M is greater than N, a credit is issued and M is decremented. In this example, a credit is issued and M is decremented to 127 and since a command was received by the device 405, are if there is enough space available in the command buffer, which is the case in this example, credits would be brought back up to 16 again providing the host with 16 credits. Every time the host sends a command and if there is enough space available in the command buffer (M≧N), another credit is issued to the host.

When a non-command frame is received from the host or initiator, no credit is granted. Thus, upon receipt of a link services frame, no credit is provided and N is decremented by one.

At some point in time, after having received a certain number of commands or non-commands, the microprocessor 471 starts to process the received frames and upon doing so, the frames, whether command and/or link services frames are released from the buffer 426 or 446 and the space in which these frames resided is released and becomes available. This is referred to as firmware release frames. If the released space (the number of released spaces is represented by the value 'J') is updated, no credit is provided or issued. At this point, for non-commands, K=K+J and N=N+J and if M is greater than N (the number of available space in the command queue is larger than the space available in the buffers other than the command buffers) then K credits are granted and K is set to '0'. When J spaces are released, for commands, M=M+J and then K credits are granted and K is set to '0'.

The goal is to ensure that the total outstanding credit is not larger than the number of available spaces in the buffers. A predetermined portion of the receive buffer is allocated to store non-command frames and another predetermined portion thereof is allocated for storing command frames. The goal is to prevent the space from exceeding the number of credits provided to the host. Thus, the total number of credits granted to the initiator or host cannot exceed the number of free spaces in the receive buffer, such as the buffer 426 or the buffer 446. So long as this condition is met, the host is provided credit. In this manner, the number of credits is decided; the more credits that can be granted without violating the foregoing rule, the more credits that will be issued.

The foregoing process is performed by execution of firmware, stored in the RAM 475, by the processor 471. During releasing of spaces occupied by the command and/or LS/ELS frames, by execution of firmware, the microprocessor 471 moves the stored command and/or LS/ELS frames from the buffers 426 and 446 to the data RAM 476.

The credit handling process, performed by the device 405, allows for different frame types having different frame sizes to be handled using only one processor. It should be understood that numbers provided herein are merely for the purpose of providing an example and are in no event to be construed as a limitation of any of the embodiments of the present invention.

Credit is managed in a manner so that at no time is there a possibility for the host to send frames when no buffer space is available. At the same time, the goal is to store more of one type of frame than the other types. In this manner, credit is provided for those types of frames that are desirable as soon as such a frame type is received, whereas, less desirable types of frames are not immediately afforded such courtesy in that a credit does not immediately follow receipt of less desirable frames.

In one embodiment of the present invention, command frames are more desirable by the host and they, upon receipt thereof, cause immediate credit therefor. The reason for the preference of command frames is that they can be stored in the receive buffer and processed later thereby avoiding the need for two processors. That is, only one processor is necessary, such as the microprocessor 471 of FIG. 3.

In FIG. 3, each of the ports, port 411 and port 431, concurrently and independently sends and receives information, such as frames, to target devices. Nevertheless, only one processor, i.e. the microprocessor 471 is employed.

Examples of the different HDD interfaces are Serial ATA, ATA.

Figure 4C:
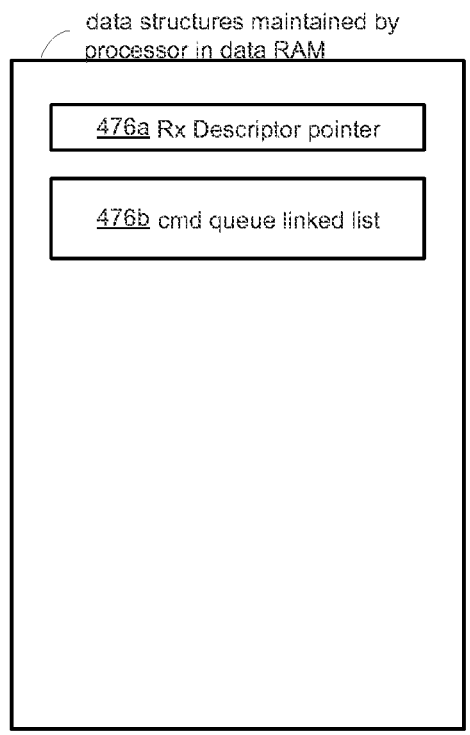
FIG. 4c shows data structures maintained by the processor 471 of FIG. 3
Figure 1B:
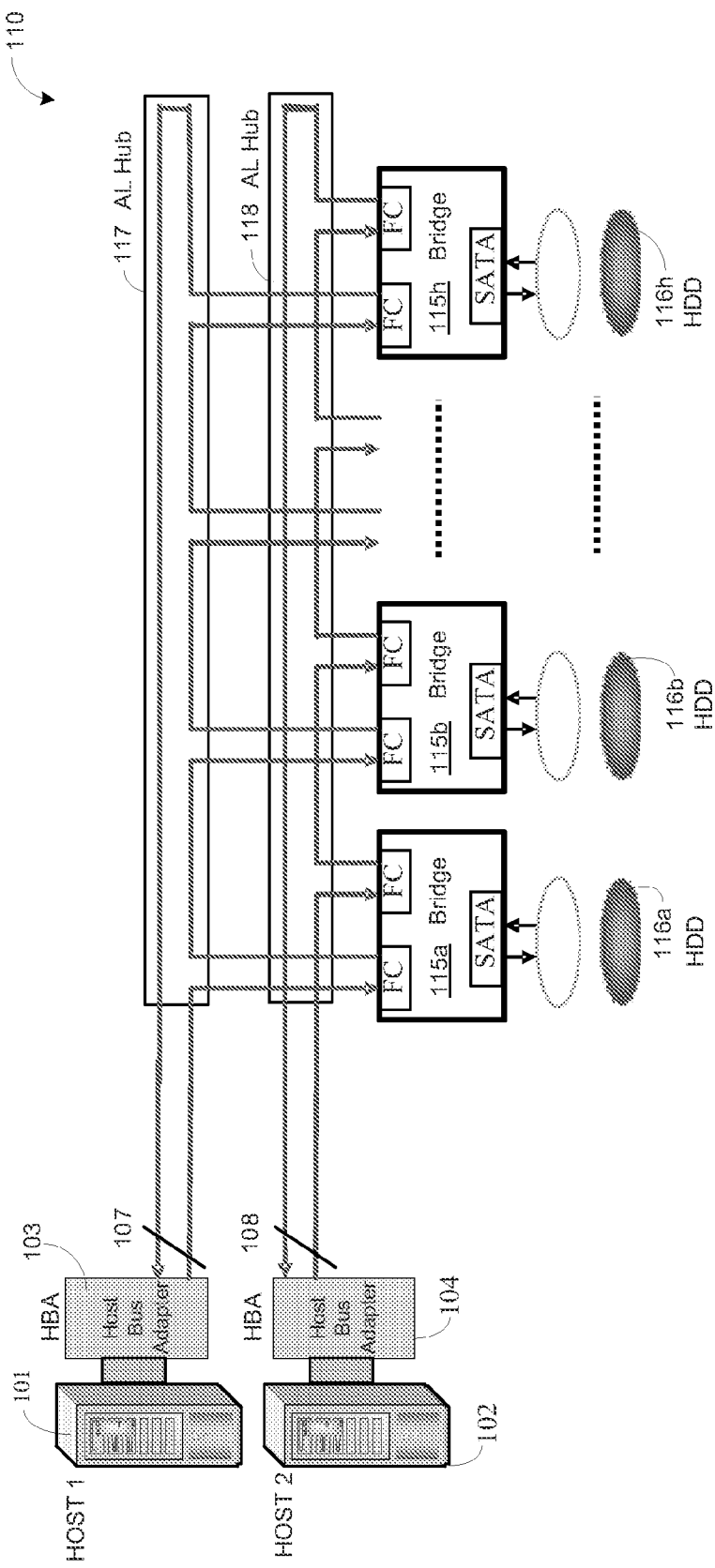
FIG. 1b shows an example of a fiber channel target bridge system 110 in a loop topology.

It should be noted that in FIGS. 3 and 4, alternatively, the buffers 492 and 496 may be combined into one buffer for storing data frames.

Figure 4B:
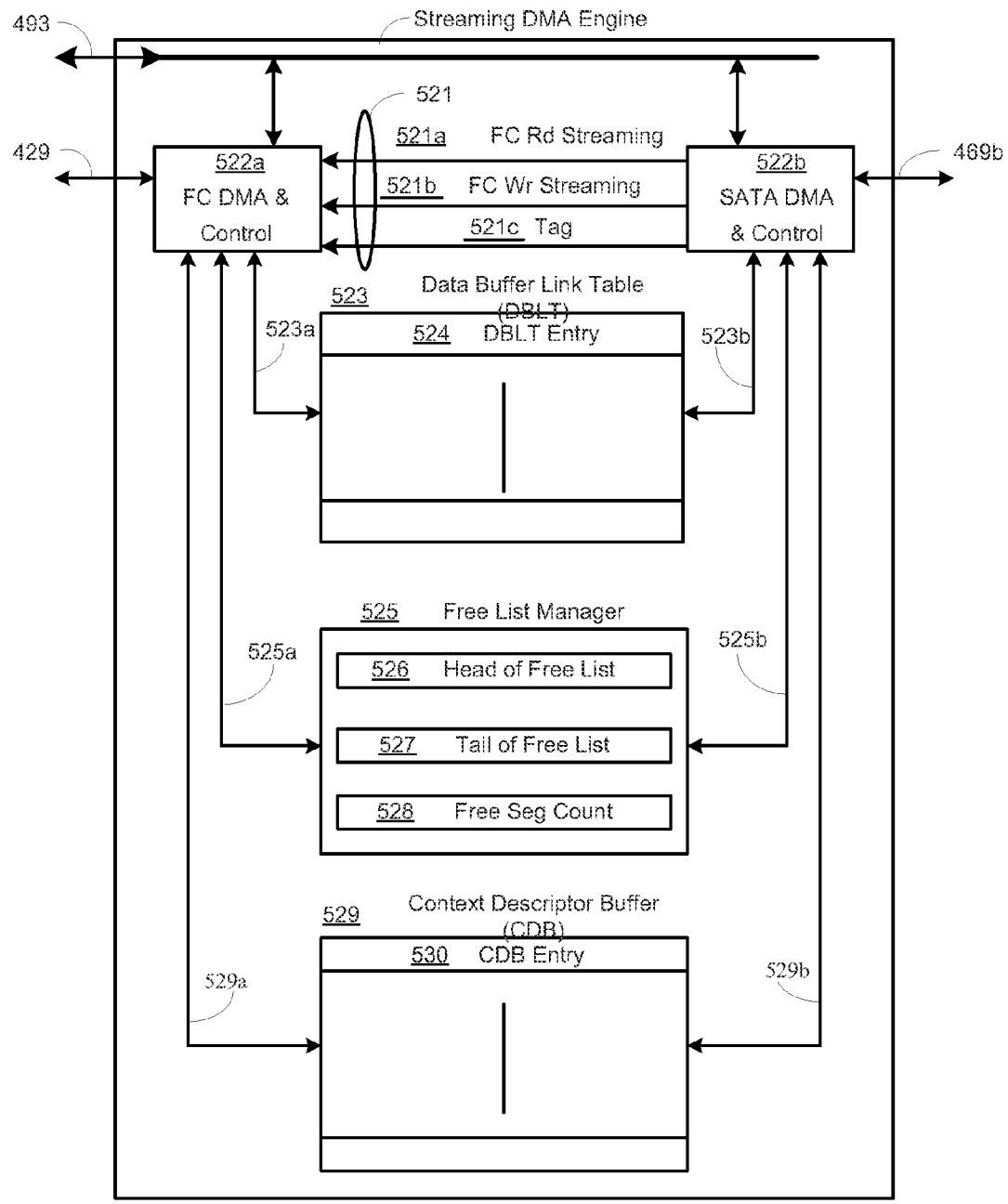
FIG. 4b shows a block diagram of Streaming DMA Engine.

FIG. 4b shows a block diagram of the streaming DMA engine 494 and 498 of FIG. 3. The streaming DMA engine 494 is shown to include, a FC DMA and control 522a, a SATA DMA and control 522b, a data buffer link table (DBLT) 523 a free list manager 525, and a context descriptor block 529. The FC DMA and control 522a is shown coupled to DBLT 523, free list manager 525 and context descriptor buffer 529 via buses 523a, 525a and 529a respectively, The FC DMA and control 522a is shown coupled to data buffer 492 via bus 493 and to FC port 411 via bus 429. The SATA DMA and control 522b is shown coupled to DBLT 523, free list manager 525 and context descriptor buffer 529 via buses 523b, 525b and 529b respectively. The SATA DMA and control 522b is shown coupled to data buffer 492 via bus 493 and to device port controller 461 via bus 469b. The FC DMA and control 522a and SATA DMA and control 522b are coupled via a bus 521.

The FC DMA & control 522a and SATA DMA & control 522b use a linked list for the DMA. Typically DMA operation specifies a starting address in buffer and a transfer count. A linked list DMA allows linking multiple non-contiguous buffer segments for the DMA operation, wherein each buffer segment is specified by a pointer and size. The DMA link list is maintained in the DBLT 523. The DBLT 523 includes plurality of DBLT entries. A DBLT entry corresponds to a fixed size buffer segment. DBLT entry 0 corresponds to buffer segment 0, DBLT entry 1 corresponds to buffer segment 1 and so forth. The structure of DBLT entry 524 is shown in FIG. 8. The DBLT entry 524 is shown to include a plurality of flag fields, a next data buffer pointer (NDBP) field 524b, a current segment payload size 524a. The flag fields include a valid flag (V) 524c, an end flag (E) 524d, a next data pointer valid flag (NDBPV) 524e. When the V flag 524c value is a logical 1 it indicates that the buffer segment contains valid data. When the NDBPV flag 524e value is a logical 1, it indicates that NDBP field 524b contains a valid buffer segment pointer to link to the next buffer segment. When the E flag 524d value is a logical 1 it indicates that this entry is the last entry of the linked list.

The free list manager 525 manages a list of free buffer segments within data buffer. The free list manager 525 is shown to include a head of free list 526, a tail of free list 527 and a free segment count 528. The free list manager 525 is coupled to FC DMA and control 522a, and SATA DMA and control 522b via bus 525a and 525b respectively, these buses including request to get free buffer, or reserve free buffer and responses. The free list manager performs the following functions:

In response to a request for free buffer segment by other entity (such as the FC DMA and control 522*a* and SATA DMA and control 522*b*), provides status of request, and if available, provides a free buffer segment pointer, and updates the free list;

In response to a request to reserve a number of free buffer segment by other entity (such as the FC DMA and control 522*a* and SATA DMA and control 522*b*), provides status of request, and if available reserves the requested number of buffer segments for future request for free buffer by that entity; and In response to a request to return a buffer segment to the free list by other entity, updates the free list.

The streaming DMA information is maintained in context descriptor buffer (CDB) 529. The CDB has an CDB entry 530 for every streaming DMA identified by Tag assigned by the processor 471. The structure of CDB entry 530 is shown in FIG. 6*a*. The CDB entry 530 is shown to include a header field 531 which includes the FC frame header or expected FC frame header, a transfer count field 532, a relative offset (RO) field 533 a streaming control field 534, a FC transfer pointer field 535, and a SATA transfer pointer field 536.

The structure of FC transfer pointers field 535 is shown in FIG. 6*b* to include a Fibre Channel Linked Buffer Pointer (FC LBP) field 535*a*, and fibre channel linked buffer pointer valid (FLV) flag 535*b*. The FC LBP field indicates the current data buffer pointer for FC DMA transfers. When the logical value of FLV flag is 1, it indicates a valid FC LBP field.

The structure of SATA transfer pointers field 536 is shown in FIG. 6*c* to include a SATA Linked Buffer Pointer (SATA LBP) field 536*a* and SATA linked buffer pointer valid (SLV) flag 536*b*. The SATA LBP field indicates the current data buffer pointer for SATA DMA transfers. When the logical value of SLV flag is 1, it indicates a valid SATA LBP field 536*a*.

The structure of streaming control field 534 is shown in FIG. 6*d* to include a field 534*a*, a flag field 534*b*, a next command link field 534*c* and a flag field 534*d*.

The structure of flag field 534*d* is shown in FIG. 7*a* to include a context descriptor valid (DV) flag, a command complete (CC) 534[30] flag and a used segments (USEG) field 534[29:24]. When the logical value of DV flag is 1, it indicates that the context descriptor entry 530 contains valid information. After the processor 471 completes setting up the context descriptor entry 530, the processor 471 sets the DV flag to logical value of 1. When the logical value of CC flag 534[30] is 1, it indicates that the command is completed, the processor 471 resets the CC flag 534[30] to a logical value of 0, and when the command is completed, the streaming DMA engine sets the CC flag 534[30] to a logical value of 1. The USEG field 534[29:24] indicates the number of buffer segments used by the descriptor. This field is updated by the streaming DMA engine 494.

The structure of next command link field 534*c* is shown in FIG. 7*b* to include a next context valid (NV) flag 534[23] and a next tag (NST) field 534[20:26]. This NV flag is set to 1 by the streaming DMA engine 494 to indicate that the NST field is valid and contains a valid tag for the next command descriptor entry. The streaming DMA engine 494 updates this field in the case where there are two consecutive read commands and the SATA data transfer for the second command occurs while the FC data transfer for the first command is ongoing.

The structure of flag field 534*b* is shown in FIG. 7*c* to include a plurality of flags. The flags include:

FC Streaming flag 534[15]; when a logical value 1 indicates FC streaming has been initiated Scratch Buffer (SB) flag 534[13], when a logical value 1 indicates a single sector data transfer either to or from the Scratch Buffer 465.

Data Streaming (DS) flag 534[12], when a logical value 1 indicates a streaming operation Pre-Fetch (PR) flag 534[10], when a logical value 1, indicates that a predefined amount of data for the write command is being pre-fetched.

Figure 10A:
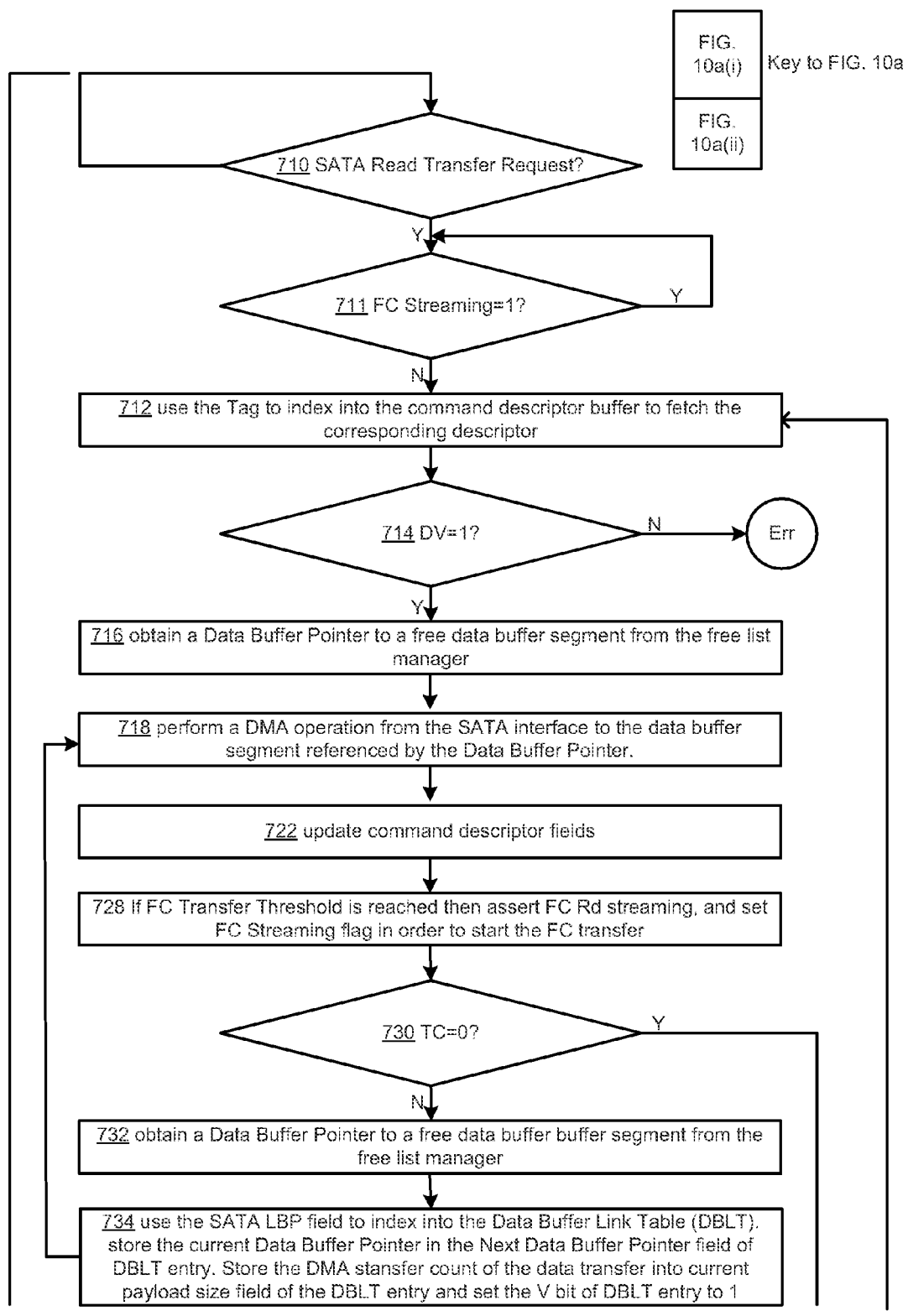
Figure 11A:
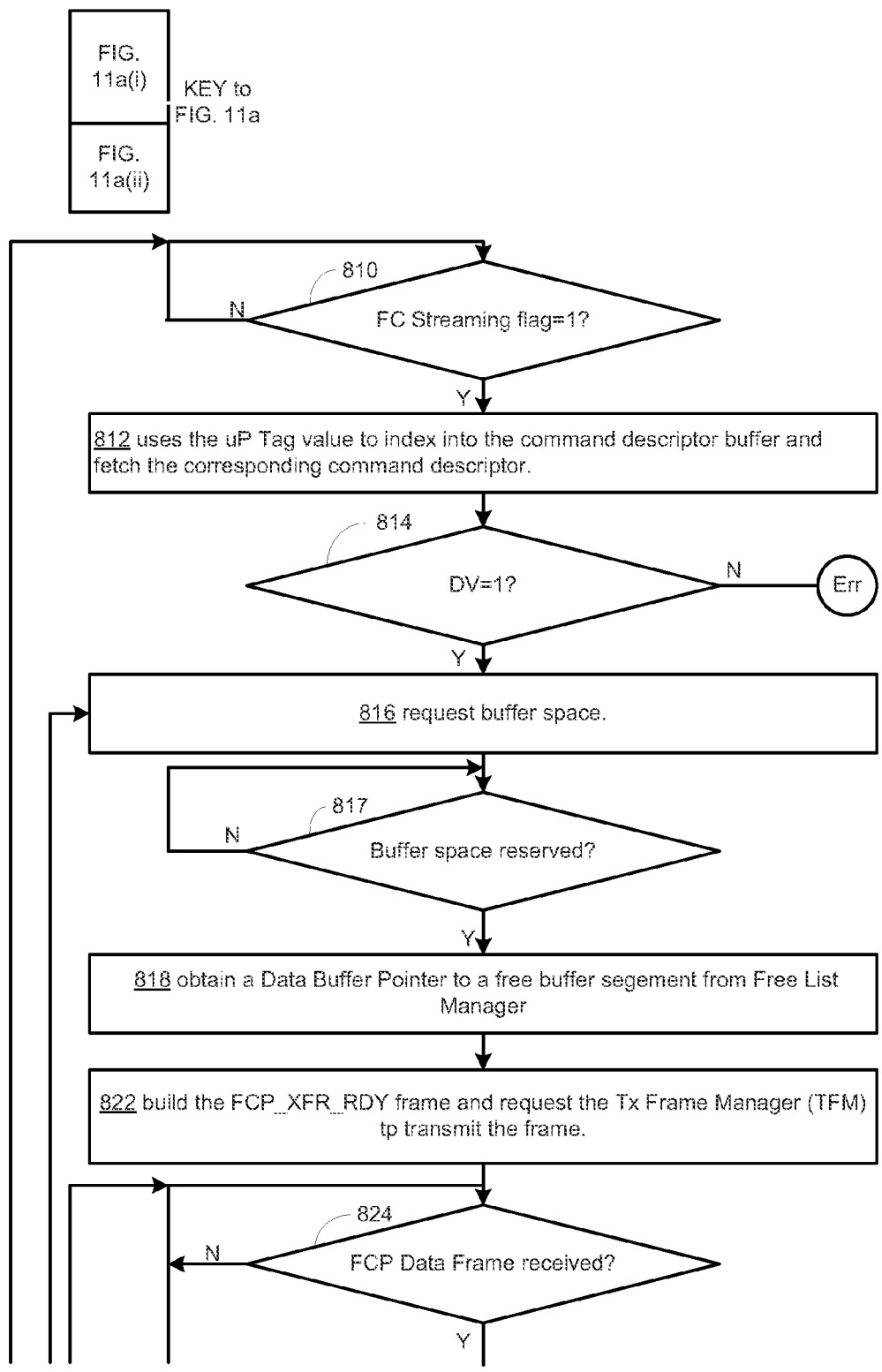
FIG. 11a, 11b show a flow chart of a streaming write operation.
Figure 11B:
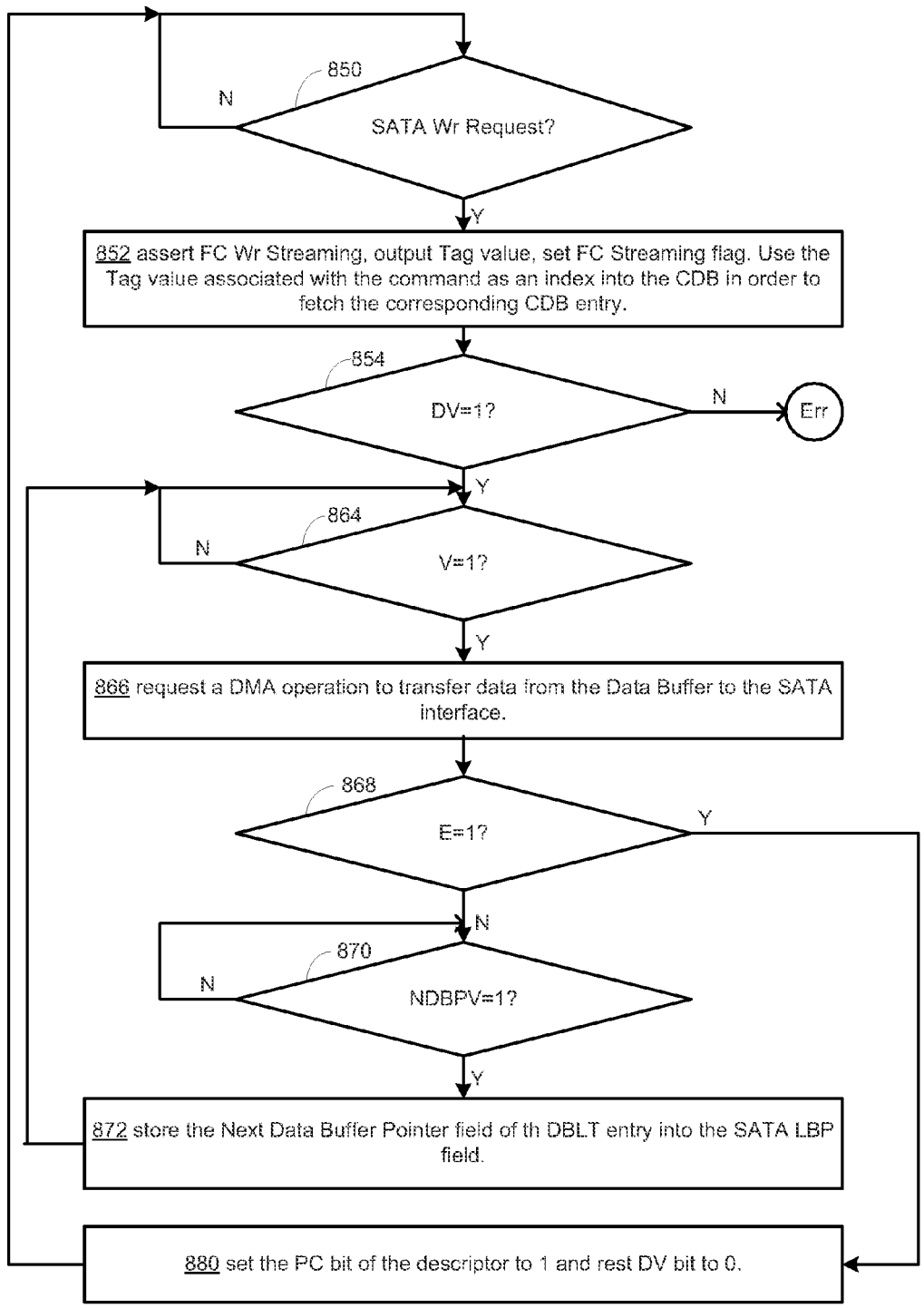

The SATA DMA and control 522*b* initiates the FC DMA transfer by asserting FC Read (Rd) Streaming 521*a*, or FC Write (Wr) Streaming 521*b*, along with a Tag 521*c* which is the CDB entry 530 in the CDB buffer 529 corresponding to the command The flow chart of SATA read streaming DMA is shown in FIG. 10*a*, and the flow chart of FC read streaming DMA is shown in FIG. 10*b*. The flow chart of SATA write streaming DMA is shown in FIG. 11*a*, and the flow chart of FC write streaming DMA is shown in FIG. 11*b*.

Referring to FIG. 10*a*, a flow chart showing the process for SATA read streaming will be presented. At step 710, the SATA DMA is checking for receipt of a SATA read request and if a SATA read request is received, the process continues to step 712 and the SATA DMA uses the tag value to index into the CDB 529 to fetch the corresponding CDB entry 530. Next, at step 714, the SATA DMA checks the DV flag 534[31] for a valid descriptor and if DV logical value is 0 indicating an invalid descriptor, the process continues to Error (Err) State, otherwise, the process continues to step 716 to obtain a free data buffer segment pointer from the free list manager 525.

After obtaining a free data buffer segment pointer, the process continues to step 718 and a DMA operation is performed from SATA to the data buffer segment referenced by the pointer obtained. After the completion of DMA or filling, the data buffer segment continues to step 722. At step 722, the context descriptor fields are updated including transfer count (TC) 532, and process continues to step 728. At step 728, if the FC transfer threshold is reached, the FC Rd streaming 521*a* is asserted along with outputting Tag value on Tag signals 521*c* and step 730 is executed.

In this embodiment, the FC transfer threshold is reached if a predefined percentage of total transfer count is in the data buffer or a predefined amount of data is in the data buffer or the buffer is full. At step 730, the TC is checked to determine whether or not it has reached the value zero. If at step 730, the TC is determined to have reached zero, the process continues to step 737, otherwise, the process continues to step 732. At step 732, a free data buffer segment pointer is obtained from the free list manager 525. After obtaining a free data buffer segment pointer at step 732, the process continues to step 734, saving the pointer in the NDBP field of current DBLT entry, storing the amount of data transferred at step 718 (which in this case is equal to buffer segment size) in the CSPZ field of current DBLT entry and setting the V flag and NDBPV flags of the current DBLT entry to a logical value of 1.

After completing step 734, to the process continues to step 718 and, repeats the above operations until at step 730, the TC reaches zero, at which point the process continues to step 737. At step 737, the amount of data transferred at step 718 is stored in the CSPZ field of current DBLT entry, the V flag and E flags of the current DBLT entry are set to a logical value of 1 and the process continues to step 738.

Setting the E flag of current DBLT entry at step 734 indicates that this entry is the last entry in the linked list of DBLT entries. At step 738, it is determined whether or not a new SATA read transfer is requested. If a new SATA read is not requested, the process continues to step 710 and waits for a new SATA read request, otherwise, the process continues to step 740 and checks if the current FC read operation is completed, that is, if the FC streaming flag is set to logical value 0, in which case the process continues to step 712, otherwise, the process moves to step 742 and updates the next command link field 534c of the CDB entry. At step 742, the NV flag is set to logical value 1 and the Tag value of the new command is saved in the NST field. After completing step 742, the process continues to step 712 and proceeds as described above.

Referring to FIG. 10b, a flow chart for the process of FC read streaming will be presented. At step 750, the process awaits the FC streaming flag to reach logical value 1, at which point, the process continues to step 752. At the step 752, the Tag value is used to index into the CDB 529 to fetch the corresponding CDB entry 530. Next, at step 753, the DV flag 534[31] is checked for a valid descriptor, if the value of the DV flag 534[31] indicates 0, an invalid descriptor enter Error (Err) State is noted, otherwise, the process proceed to the next step 754. At step 754, the FC LBP field 535a of the FC transfer pointer 535 in the CDB entry 530 is used to index into the DBLT 523 and to fetch the DBLT entry 524, and then the process continues to step 755. At step 755, the V flag 524c of the fetched DBLT entry 524 is checked until the V flag 524c is a logical value 1, which indicates valid data is in the buffer segment, and then the process continues to step 756. At step 756, the FC frame header, the data buffer pointer, and the transfer length is sent to the Tx frame manager 416 for transmission on the FC link 407, subsequently, the CDB entry 530 fields are updated and the process proceeds to step 757.

At step 757, the E flag 524d of the DBLT entry 524 is checked, if the E-flag is a logical value 1, which indicates that no more frame transmission is required, the process proceeds to step 762, otherwise, the process proceeds to step 758. At step 758, a wait cycle is entered until the NDBPV flag 524e is at a logical value of 1, which indicates that the pointer NDBP 524b is valid, and then the process continues to step 759.

At step 759, the NDBP 524b is saved in the FC LBP field 535a of the CDB entry 530, and process proceeds to step 760. At step 760, a wait cycle is entered for completion of frame transmission and, next, a request is made to free the list manger 525 to release the buffer segment, and then proceed to step 754 repeating the above process until at step 757, the E flag 524d of the DBLT entry 524 is at a logical value of 1, indicating no more frame transmission is required.

Next, at step 762, another wait cycle is entered waiting for transmission of the last frame, and then sending a request to free the list manger 525 to release the buffer segment, and then setting the PC flag 534[31] to a logical value of 1 and then continuing to step 764. At step 764, the NV flag 534[23] is checked for logical value 1, which would indicate that a SATA transfer for another queued command is in progress and next, the process continues to step 766.

At step 766, the DV flag 534[31] is reset and the next CDB entry 530 corresponding to next tag NST field 534[20:16] is fetched, proceeding to step 754. At step 764, if the NV flag 534[23] is at logical value 0, the process continues to step 768, the FC streaming is reset and then the process continues to step 750.

Referring to FIG. 11b, the process of SATA write streaming will be presented in flow chart form. At step 850, the SATA DMA 522b is checking for receipt of a SATA write request. If a SATA write request is received, step 852 is executed. At step 852, the FC Wr streaming 521b is asserted, the tag value is coupled onto the tag signals 521c for outputting thereof, the FC streaming flag is set and the tag value is used to index into the CDB 529 to fetch the corresponding CDB entry 530.

Next, at step 854, the DV flag 534[31] is checked for a valid descriptor. If the DV logical value is 0, an invalid descriptor is indicated and the process proceeds to Error (Err) State, otherwise, the process goes to step 864. At step 864, the DBLT entry 524 corresponding to the SATA LBP 536a is fetched, and the V flag 524c is checked for a value of 1 which would indicate valid data is available in the buffer segment. If the V flag 524c is a logical value 1, the process continues to step 866, otherwise, step 864 is repeated until the V flag 524c is at a logical value of 1. At step 866, a DMA operation is performed from data buffer segment referenced by the pointer to SATA. After completion of the DMA operation, the process continues to step 868. At step 868, the E flag 524d of the DBLT entry is checked and if the E flag is determined to be at logical value 1, indicating a last DBLT entry on the linked list, the process proceeds to step 880, otherwise, the process proceeds to step 870.

At step 870, the NDBPV flag 524e is checked and if determined to be logical value 0, step 870 is repeated until the NDBPV flag 524e is determined to be at logical value 1 and the process proceeds to step 872. At step 872, the NDBP field 524b is stored in the SATA LBP field 536 of the CDB entry 530, and the process goes back to step 864. At step 880, the PC flag 534[30] is set to logical value 1 and the DV flag 534[31] is set to logical value 1 and the process goes back to step 850.

Referring to FIG. 11a, a flow chart outlining the process undertaken by Streaming DMA Engine 494 or 498 during the FC write streaming is presented. At step 810, a FC streaming flag is checked until FC streaming flag is logical value 1, at which point, the process continues to step 812. At step 812, the tag value is used to index into the CDB 529 to fetch the corresponding CDB entry 530. Next, at step 814, the DV flag 534[31] is checked for a valid descriptor, if the DV flag indicates a logical value of 0, an invalid descriptor enter Error (Err) State is declared, otherwise, the process continues to next step 816. At step 816, a request to reserve buffer space from a free list manager to continue to step 817 is performed and the process waits until the request is granted, at which point step 818 is performed.

At step 818, a free data buffer segment pointer is obtained from the free list manager 525. After obtaining a free data buffer segment pointer, the process continues to step 822. At step 822, the FCP_XFR_RDY frame is built and sent to the Tx frame manger for transmission thereof. The FCP_XFR_RDY frame causes a request of the data frame to be sent to the FC bridge.

At step 824, the process awaits receipt of a data frame and continues to step 826 to check for a match between the received data frame header and the expected frame header in the CDB. If a mismatch is determined, the process goes back to step 824 waiting for data frame, otherwise, the process continues to step 828. At step 828, the data frame payload is sent through a DMA operation to the data buffer segment referenced by the obtained pointer. After the completion of the DMA operation, the process proceeds to step 834. At step 834, the CDB entry fields are updated including a transfer count (TC) and then the process continues to step 836.

At step 836, the TC is checked for reaching the value zero. If at step 836, it is determined that the TC has reached zero, the process continues to step 848, otherwise, the process continues to step 838. At step 838, the amount of data transferred at step 828 in the CSPZ field of the current DBLT entry is stored, the V flag of the current DBLT entry is set to a logical value of 1 and the process continues to step 840.

At step 840, a free data buffer segment pointer is obtained from the free list manager 525. After obtaining a free data buffer segment pointer, the pointer in the NDBP field of current DBLT entry is saved, the NDBPV flag of the current DBLT entry is set to a logical value of 1. After completing step 840, the process continues to step 842. At step 842, the frame is checked as to whether it was the last frame of the sequence and if so, the process goes back to step 816, otherwise, the process goes back to step 824. The above operation is repeated until at step 836, the TC reaches zero, at which point the process continues to step 848.

At step 848, the amount of data transferred at step 828 in the CSPZ field of current DBLT entry is stored, the V flag and E flags of the current DBLT entry are set to a logical value of 1 and the process continues to step 810. Setting the E flag of current DBLT entry at step 848 indicates that this entry is the last entry in the linked list of DBLT entries.

The write streaming operation has a latency between SATA write request and receiving first data frame from FC after initiating FC transfer. In order to eliminate or minimize this latency, the write data or a portion of write data can be prefetched prior to receiving the SATA write request. In another embodiment the step 810 can modified to check either FC streaming flag or prefetch flag 534[10]. When the prefetch flag is set the FC treaming is initiated, a predetermined amount of write data is prefetched and when the SATA Wr request is received some amount of write data is in the buffer and SATA transfer can commence without latency while the FC write streaming will resume and the operation will continue as described above.

The above invention has been described for the case that the logical block sizes on the host commands and the sector size on the HDD are the same, for example 512 bytes. Specifically there are practical applications where the logical block sizes and sector size are different. An example is when logical block sizes are 520 or 528 byte and the sector size on HDD is 512. It is obvious for one skilled in the art to use the teaching of this invention and apply to the case that logical block sizes are 520 or 528 and the sector size on HDD is 512. Such extension fall within the scope of the invention One of the applications of the embodiments of the present invention includes fast FC data rates and high-performance HDD having a very short seek time wherein a two-processor system is utilized.

Figure 12I:
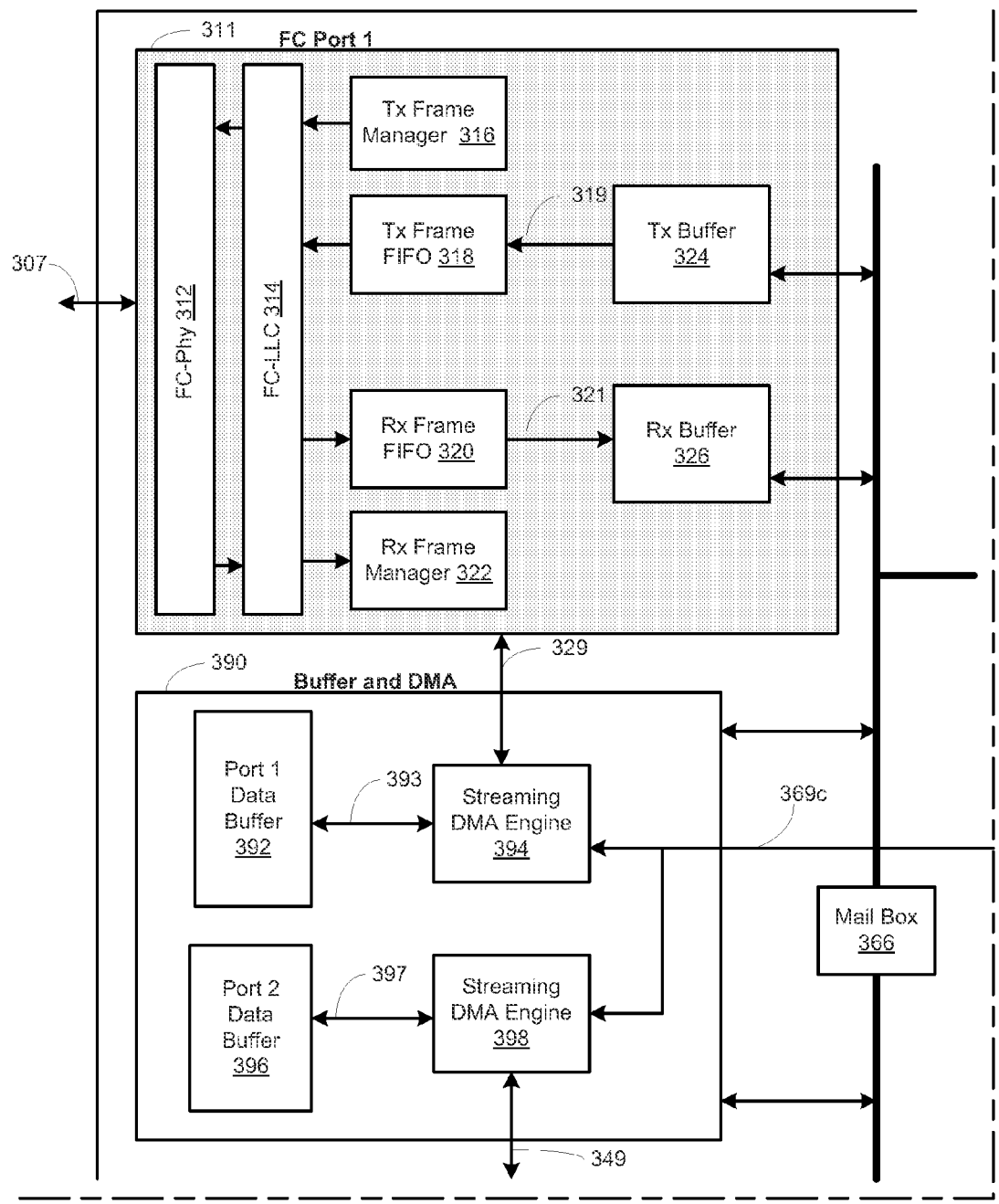
FIG. 12 shows a fiber channel target device 305 in accordance with another embodiment of the present invention.
Figure 12:
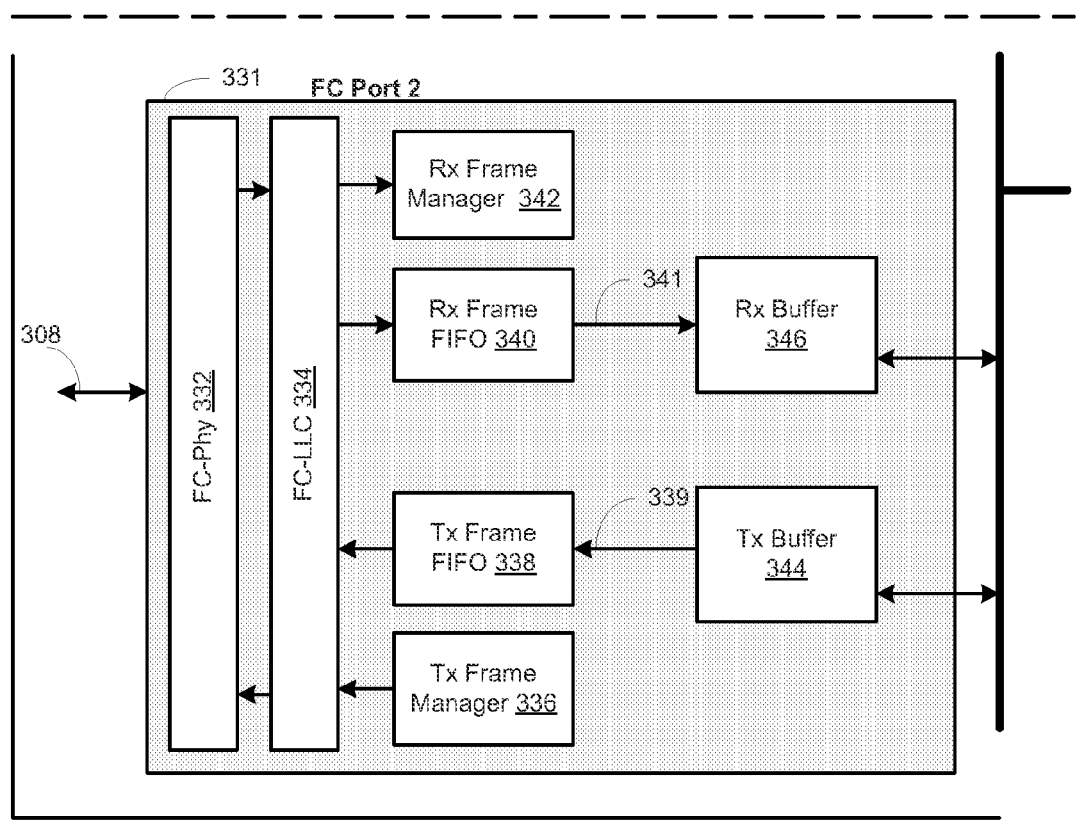
Figure 12:
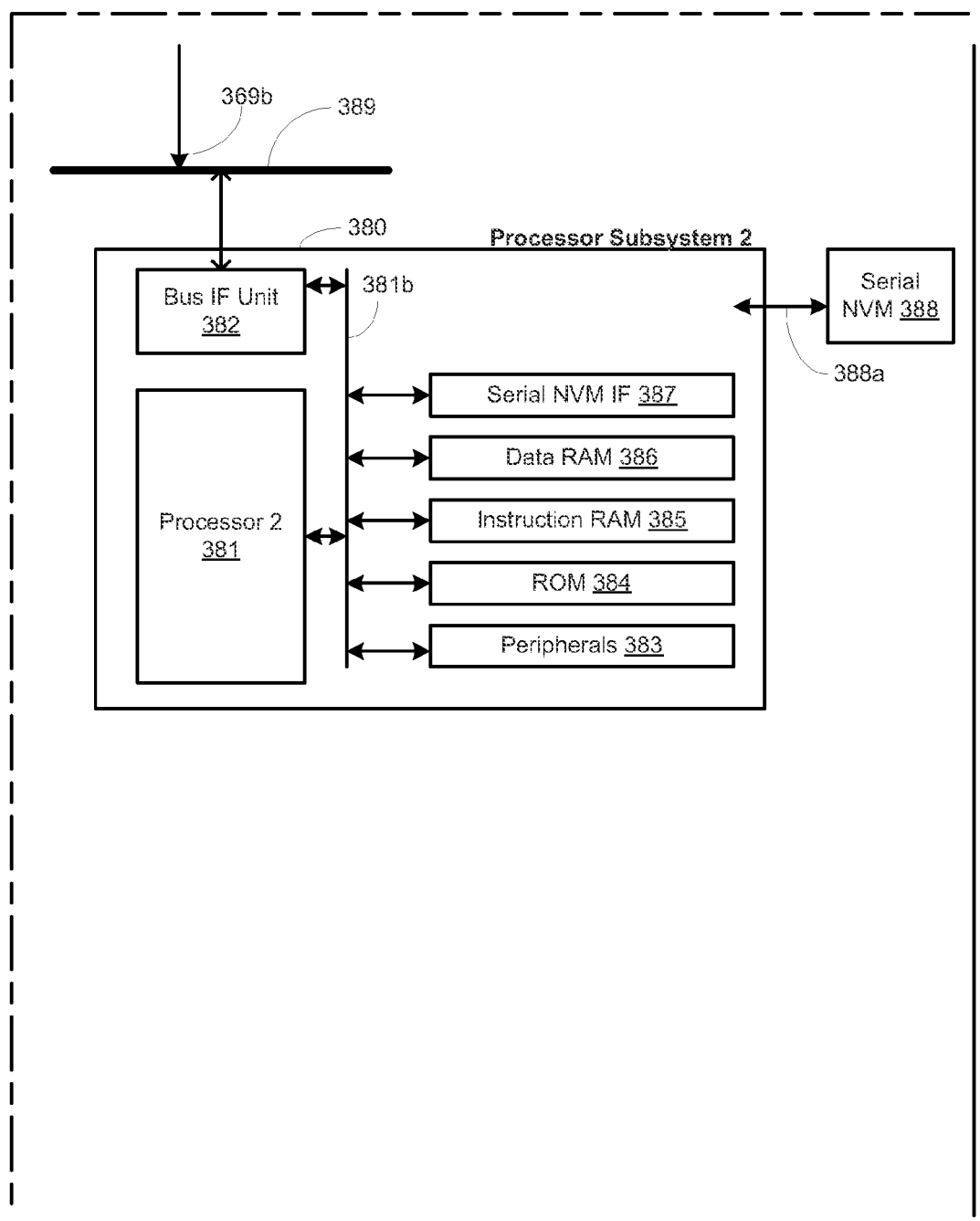

FIG. 12 shows a fibre channel (FC) target bridge 305 using two microprocessors utilizing the embodiments of present invention. The target bridge 305 is shown to include a FC port 311, a FC port 331, device port 351, a device port controller 361, a buffer and DMA 390, a processor subsystem 370 and a processor subsystem 380. The target bridge 305 is shown to include a FC link 307, a FC link 308, and a SATA link 309.

The processor subsystem 370 is shown to include a processor (or microprocessor) 371, coupled via bus 371b to a bus interface (IF) unit 372, a data RAM 376 (for storing data), an instruction RAM 375 (for storing program code), a Read-Only-Memory (ROM) 374, a serial non-volatile-memory (NVM) IF 377, and one or more peripherals 373. The serial NVM IF 377 is shown coupled to a NVM 378 through a serial interface 378a. In an alternative embodiment, the instruction RAM 375 and data RAM 376 are combined into a single RAM. Instructions or program code is loaded into the instruction RAM 376 from the serial Flash 378, via the serial Flash IF 378a, upon power-on initialization. This allows instructions to be executed from a fast memory (i.e. RAM) to avoid wait states and to allow single cycle execution of instructions.

In FIG. 12, a mailbox 366 is shown coupled to the processor 371, via the bus 379, and shown further coupled to the processor 381 via the bus 389. The mailbox 366 is accessed to facilitate inter processor communication between the processor subsystem 370 and the processor subsystem 380.

In alternate embodiments, a parallel NVM interface is used. Examples of NVM include Flash Memory or EEPROM. The bus interface unit 372 couples the processor subsystem 370 to external units via bus 379. Examples of peripheral include interrupt controller, General Purpose 10 (GPIO) controller, Timer units, Clock generation units, serial interface unit, and a parallel interface unit.

The structure, operation and coupling of the processor subsystem 380 are similar to that described hereinabove with respect to the processor subsystem 370. That is, the processor subsystem 380 is shown to include a processor 381, coupled via bus 381b to a bus interface (IF) unit 382, a data RAM 386, an instruction RAM 385, a ROM 384, a serial NVM IF 387, and peripherals 383. The serial NVM IF 387 is shown coupled to a NVM 388 through a serial interface 388a.

The FC port 311 is shown to include a FC link 307, a fiber, channel physical layer 312, a fiber channel link layer controller (LLC) 314, a transmit frame manager 316, a transmit (Tx) frame first-in-first-out (FIFO) 318, a receive (Rx) frame FIFO 320, a receive (Rx) frame manager 322 coupled together as shown in FIG. 12. The transmit (Tx) buffer 324 is shown coupled to the Tx frame FIFO 318 via the bus 319. The receive (Rx) buffer 326 is shown coupled to the Rx frame FIFO via the bus 321. The processor subsystem 370 accesses the Tx buffer 324, Rx buffer 326, configuration, control and status registers in Tx Frame manager 316, Rx frame manager 322, LLC 314 and Phy 312 via the bus IF unit 372 and the bus 379.

The structure and coupling of the FC port 331 and all of the other FC port 331 devices are similar to that described hereinabove with respect to the FC port 311. That is, the FC port 331 is shown to include a FC link 308, a fiber channel physical layer 332, a fiber LLC 334, a Tx frame manager 336, a Tx frame FIFO 338, a Rx frame FIFO 340, a Rx frame manager 342 coupled together as shown in FIG. 12. The Tx buffer 344 is shown coupled to the Tx frame FIFO 338 via bus 339. The Rx buffer 346 is shown coupled to the Rx frame FIFO 340 via bus 341. The processor subsystem 380 can access the Tx buffer 344 and Rx buffer 346 configuration, control and status registers in Tx Frame manager 336; Rx frame manager 342, LLC 334 and Phy 332 via the bus IF unit 382 and the bus 389.

The buffer and DMA 390 is shown to include a data buffer 392 coupled to a Data Memory Access (DMA) engine 394 via the bus 393 and a data buffer 394 coupled to a DMA engine 396 via the bus 395.

The device port 351 is shown to include a SATA Phy Layer 352, a SATA Link Layer 354, a SATA Transport Layer 356, and a SATA command layer 358. The device port 351 is shown coupled to a SATA link 309. The device port controller 361 is shown to include a register file 362 coupled to SATA Command Layer 358 via the bus 369d and a mapping circuit 364. The register file includes a Task file 362a and a control/status (CS) registers 362b. The device port controller 361 is coupled to the buffer and DMA 390 via the bus 369c. The processor subsystem 370 accesses the configuration, control and status registers in the device port controller 361 via the bus IF unit 372 and the bus 379. The processor subsystem 380 accesses the configuration, control and status registers in the device port controller 361 via the bus IF unit 382 and the bus 389.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention. It is obvious to an expert in the art to combine the present invention with prior art to develop devices and methods that perform multiple functions including the teachings of this invention. Such devices and methods fall within the scope of present invention.

What is claimed is:

1. A method of dynamic credit management in a fiber channel target device comprising:

receiving data in the form of frames by a fiber channel target device, the frames being of a first and second type and sent by a host;

storing the received frames in a buffer having a buffer size;

processing the frames using a microprocessor; and dynamically issuing credit for receipt of further frames being of the first or second type, wherein credit is provided for those types of frames that are desirable to the host as soon as such a frame type is received with no possibility of the host to send frames when no buffer space is available and to store more of one type of frame than the other types, the dynamically issuing credit including the steps of, initializing a first counter to a value M, representing a maximum queue size, initializing a second counter to a value N, representing a maximum credit size, and initializing a third counter to a value K, representing the difference between N and M;

determining if a command frame has been received and if so, issuing a credit if M is bigger than or equal to N and setting M equal to M minus one;

if no command frame is determined to have been received, determining if a non-command frame has been received and if so, setting N equal to N minus one, avoiding issuing credit when a non-command frame is received from the host;

after having received a certain number of command or non-command frames, processing the received frames;

upon processing the received frames, releasing the space in the buffer where the received frames are stored, the number of released spaces being represented by the value 'J', and wherein for non-command frames, K=K+J and N=N+J;

if M is greater than N, granting K credits and setting K to '0'; and when J spaces are released, for command frames, setting M=M+J and granting K credits and then setting K to '0'.

2. A method of dynamic credit management as recited in claim 1 wherein the first and second frame types include command frames, link services frames, common fiber channel service frames, arbitrated loop initialization frames and data frames.

3. A method of dynamic credit management as recited in claim 2 wherein the fiber channel target device distinguishes frames by type and provides immediate credit to command frames, wherein upon receipt, command frames, upon receipt, cause immediate credit therefor.

4. A fiber channel target device comprising:

a Rx frame manager responsive to receive data in the form of frames from a fiber channel target device, the frames being of a first and second type and sent by a host, the Rx frame manager operative to store the received frames in a buffer having a buffer size, and to dynamically issuing credit for receipt of further frames that are of the first or second type, wherein credit is provided for those types of frames that are desirable to the host as soon as such a frame type is received with no possibility of the host to send frames when no buffer space is available and to store more of one type of frame than the other types, the Rx frame manager including, a first counter, initialized to a value M, representing a maximum queue size;

a second counter, initialized to a value N, representing a maximum credit size;

a third counter, initialized to a value K, representing the difference between N and M, the Rx frame manager operative to determine if a command frame has been received and if so, issuing a credit if M is bigger than or equal to N and setting M equal to M minus one;

if no command frame is determined to have been received, determining if a non-command frame has been received and if so, setting N equal to N minus one, avoiding issuing credit when a non-command frame is received from the host;

after having received a certain number of command or non-command frames, processing the received frames;

upon processing the received frames, releasing the space in the buffer where the received frames are stored, the number of released spaces being represented by the value 'J', and wherein for non-command frames, K=K+J and N=N+J;

if M is greater than N, granting K credits and setting K to '0'; and when J spaces are released, for command frames, setting M=M+J and granting K credits and then setting K to '0'.

5. A fiber channel target device as recited in claim 4 wherein the desired frames are command frames.

* * * * *